(12) United States Patent
You et al.

(10) Patent No.: US 10,789,876 B2
(45) Date of Patent: Sep. 29, 2020

(54) DISPLAY SYSTEM AND METHOD OF DRIVING THE SAME

(71) Applicant: SAMSUNG DISPLAY CO., LTD., Yongin-si, Gyeonggi-Do (KR)

(72) Inventors: Bonghyun You, Seongnam-si (KR); Mun-San Park, Hwaseong-si (KR); Jai-Hyun Koh, Yongin-si (KR); Jaehoon Lee, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 77 days.

(21) Appl. No.: 15/702,868

(22) Filed: Sep. 13, 2017

(65) Prior Publication Data

US 2018/0096647 A1    Apr. 5, 2018

(30) Foreign Application Priority Data

Oct. 4, 2016    (KR) ........................ 10-2016-0127535

(51) Int. Cl.
*G09G 3/20*    (2006.01)
*G09G 5/36*    (2006.01)
(Continued)

(52) U.S. Cl.
CPC ........... *G09G 3/2096* (2013.01); *G06F 3/044* (2013.01); *G06F 3/0412* (2013.01); *G06F 3/0416* (2013.01); *G06T 3/60* (2013.01); *G09G 3/20* (2013.01); *G09G 5/36* (2013.01); *G09G 3/36* (2013.01); *G09G 3/3674* (2013.01); *G09G 3/3685* (2013.01); *G09G 5/005* (2013.01);
(Continued)

(58) Field of Classification Search
CPC ......... G09G 3/2096; G09G 2340/0464; G09G 2340/0471; G09G 2340/0478; G09G 2340/0492; G09G 5/34
See application file for complete search history.

(56) References Cited

U.S. PATENT DOCUMENTS 4,929,085 A * 5/1990 Kajihara ................. G06T 3/606
                                                              345/658
5,949,408 A * 9/1999 Kang ..................... G06F 1/1618
                                                              345/100

(Continued)

FOREIGN PATENT DOCUMENTS

| KR | 10-0615182 | 8/2006 |
|----|------------|--------|
| KR | 10-0867308 | 11/2008 |
| KR | 10-1089122 | 11/2011 |

*Primary Examiner* — Kevin M Nguyen
(74) *Attorney, Agent, or Firm* — F. Chau & Associates, LLC

(57) ABSTRACT

A display system includes a display apparatus and a pivot performing part. The display apparatus includes a display panel configured to display an image and including a gate line and a data line, a gate driving part configured to output a gate signal to the gate line, and a data driving part configured to output a data signal to the data line. The pivot performing part is configured to receive, from the display apparatus, a pivot request data for performing a pivot function which rotates the image, and is to perform the pivot function on image data of the image in response to the pivot request data. A manufacturing cost of a display apparatus may be decreased, and a delay time of an image display may be decreased.

19 Claims, 16 Drawing Sheets

(51) Int. Cl.
    *G06F 3/041*         (2006.01)
    *G06F 3/044*         (2006.01)
    *G06T 3/60*          (2006.01)
    *G09G 5/00*          (2006.01)
    *G09G 3/36*          (2006.01)
    *G09G 5/393*         (2006.01)

(52) U.S. Cl.
    CPC ............. *G09G 5/363* (2013.01); *G09G 5/393* (2013.01); *G09G 2310/08* (2013.01); *G09G 2320/0252* (2013.01); *G09G 2340/0492* (2013.01); *G09G 2360/08* (2013.01)

(56) References Cited

U.S. PATENT DOCUMENTS

| | | | | |
|---|---|---|---|---|
| 6,819,334 | B1* | 11/2004 | Owada | G09G 5/393 345/649 |
| 7,535,474 | B1* | 5/2009 | Scholander | G09G 5/39 345/531 |
| 2004/0239690 | A1* | 12/2004 | Wyatt | G06T 3/606 345/649 |
| 2006/0227122 | A1* | 10/2006 | Proctor | G09G 3/20 345/204 |
| 2007/0019005 | A1* | 1/2007 | van Baarsen | G06T 1/60 345/649 |
| 2013/0050159 | A1* | 2/2013 | Wang | G09G 3/20 345/204 |
| 2015/0103085 | A1* | 4/2015 | Li | G06T 1/20 345/522 |
| 2015/0370458 | A1* | 12/2015 | Chen | G06F 3/04845 715/727 |
| 2016/0092050 | A1* | 3/2016 | Dos Santos | G06F 3/0488 715/822 |

\* cited by examiner

DISPLAY SYSTEM AND METHOD OF DRIVING THE SAME

PRIORITY STATEMENT

This application claims priority under 35 U.S.C. § 119 from Korean Patent Application No. 10-2016-0127535, filed on Oct. 4, 2016 in the Korean Intellectual Property Office (KIPO), the contents of which are incorporated by reference herein.

1. TECHNICAL FIELD

Exemplary embodiments of the present inventive concept relate to an image display, and more particularly to a display system and a method of driving the display system.

2. DISCUSSION OF THE RELATED ART

A display apparatus includes a display panel and a display panel driving apparatus.

The display panel includes a gate line, a data line, and a pixel defined by the gate line and the data line. In general, the gate lines extend in a first direction and are arranged in a second direction substantially perpendicular to the first direction. The data lines extend in the second direction and are arranged in the first direction.

The display panel driving apparatus includes a gate driving part, a data driving part and a timing controlling part. The gate driving part outputs a gate signal to the gate lines. The data driving part outputs a data signal to the data lines. The timing controlling part controls timings of the gate driving part and the data driving part.

In general, as the display panel is typically substantially rectangular, and since the gate lines extend in the first direction and are arranged in the second direction substantially perpendicular to the first direction, the gate driving part is disposed adjacent a short side of the display panel parallel to the second direction. In addition, since the data lines extend in the second direction and are arranged in the first direction, the data driving part is disposed adjacent a long side of the display panel parallel to the first direction.

However, when the data driving part is disposed adjacent the long side of the display panel, the number of the data driving integrated circuits included in the data driving part increases, and thus a manufacturing cost of the display apparatus is increased.

SUMMARY

Exemplary embodiments of the present inventive concept provide a display system that is capable of decreasing a delay time of an image display at a decreased manufacturing cost.

Exemplary embodiments of the present inventive concept also provide a method of driving the above-mentioned display system.

According to an exemplary embodiment of the present inventive concept, a display system may include a display apparatus and a pivot performing part. The display apparatus includes a display panel configured to display an image and including a gate line and a data line, a gate driving part configured to output a gate signal to the gate line, and a data driving part configured to output a data signal to the data line; and a pivot performing part configured to receive, from the display apparatus, a pivot request data to perform a pivot function which rotates a display of the image, and in response receiving the pivot request data, to perform (e.g. execute) the pivot function on image data of the image.

In an exemplary embodiment of the inventive concept, the display system may further include a graphic processing part configured to receive the image data from an external source or component (e.g. from the outside), and to process the image data. The pivot performing part may be included in the graphic processing part.

In an exemplary embodiment of the inventive concept, the display system may further include a memory configured to receive and store the image data. The graphic processing part may perform the pivot function on the image data stored in the memory, and may output pivot image data.

In an exemplary embodiment of the inventive concept, the display panel may output a signal with touch data when a touch is detected on the display panel, and the graphic processing part may perform the pivot function in response to the touch data.

In an exemplary embodiment of the inventive concept, the graphic processing part may further include a touch data processing part configured to process the touch data and output touch process data including an image related to the touch.

In an exemplary embodiment of the inventive concept, the graphic processing part may perform the pivot function on the image data and may output pivot image data, and the pivot image data may include the touch process data.

In an exemplary embodiment of the inventive concept, the display system may further include a timing controlling part configured to control a timing of the gate driving part and a timing of the data driving part. The timing controlling part may include a touch data processing part configured to process the touch data and output touch process data including an image related to the touch.

In an exemplary embodiment of the inventive concept, the display system may further include a timing controlling part configured to control a timing of the gate driving part and a timing of the data driving part. The pivot performing part may be included in the timing controlling part.

In an exemplary embodiment of the inventive concept, the display system may further include a memory configured to receive and store the image data. The timing controlling part may perform the pivot function on the image data stored in the memory, and may output pivot image data.

In an exemplary embodiment of the inventive concept, the display panel may output to the timing controlling part touch data that is generated when a touch is detected on the display panel, and the timing controlling part may perform the pivot function in response to the touch data being received.

In an exemplary embodiment of the inventive concept, the timing controlling part may further include a touch data processing part configured to process the touch data and output touch process data including an image related to the touch.

In an exemplary embodiment of the inventive concept, the timing controlling part may perform the pivot function on the image data and may output pivot image data, and the pivot image data may include the touch process data.

In an exemplary embodiment of the inventive concept, the display system may further include a graphic processing part configured to receive the image data from an external source or component, and to process the image data. The graphic processing part may include a touch data processing part configured to process the touch data and output touch process data including an image related to the touch.

In an exemplary embodiment of the inventive concept, the pivot performing part may include a first pivot performing part configured to perform a first pivot function of the pivot function on all or some of the image data, and to output first pivot image data, and a second pivot performing part configured to receive the first pivot image data, to perform a second pivot function except for a part of the image data on which the first pivot function was performed, and to output second pivot image data.

In an exemplary embodiment of the inventive concept, the display system may further include a graphic processing part configured to receive the image data from an outside, and to process the image data, and a timing controlling part configured to control a timing of the gate driving part and a timing of the data driving part. The first pivot performing part may be included in the graphic processing part, and the second pivot performing part may be included in the timing controlling part.

In an exemplary embodiment of the inventive concept, the display system may further include a pivot controlling part configured to control the graphic processing part and the timing controlling part so that at least one of the graphic processing part and the timing controlling part performs the pivot function, according to a driving frequency of the graphic processing part.

In an exemplary embodiment of the inventive concept, the pivot controlling part may further include a load determining part configured to determine a load of the graphic processing part.

In an exemplary embodiment of the inventive concept, the data line extends in a first direction parallel to a long side of the display panel, and the gate line extends in a second direction parallel to a short side of the display panel.

In an exemplary embodiment of the inventive concept, the gate driving part is disposed adjacently to the long side of the display panel, and the data driving part is disposed adjacently to the short side of the display panel.

According to an exemplary embodiment of the present inventive concept, a method of driving a display system includes receiving, from a display apparatus, a pivot request data for performing a pivot function which rotates an image, performing the pivot function on image data of the image in response to the pivot request data to output pivot image data, generating a data signal based on the pivot image data and outputting the data signal to a data line of a display panel, and outputting a gate signal to a gate line of the display panel. The display apparatus includes a display panel configured to display the image, a gate driving part configured to output the gate signal to the gate line of the display panel, and a data driving part configured to output the data signal to the data line of the display panel.

According to an embodiment of the inventive concept, a display system includes a display apparatus having a display panel configured to display an image and including a plurality of gate lines arranged in a first direction and a plurality of data lines arranged in a second direction substantially perpendicular to the first direction, a gate driving part is configured to output a gate signal to the gate line, and a data driving part configured to output a data signal to the data line; a pivot performing part comprising circuitry configured to receive, from the display apparatus, a pivot request data to perform a pivot function which rotates a display of the image, and to perform the pivot function on image data of the image in response to the pivot request data without an instruction from an external operating system.

The display system may include a graphic processing part comprising circuitry configured to receive the image data from an external source, and to process the image data, and a timing controlling part comprising circuitry configured to control a timing of the gate driving part and a timing of the data driving part, wherein the pivot performing part comprises a first pivot performing part included in the graphics processing part, and a second pivot performing part included in the timing controlling part.

The first pivot performing part may perform a pivot function on a part of the image data, and the second pivot performing part performs a pivot function on a remainder of the image data.

The first pivot performing part may perform a pivot function on the image data when a load of the graphic processing part is less than a reference load value, and when a load of the graphic processing part is equal to or greater than a reference load value, and a driving frequency of the graphic processing part is equal to or less than a reference frequency, the second pivot performing part included in the timing controlling part exclusively performs the pivot function on the image data.

According to the present inventive concept, since a data driving part is disposed adjacently to a short side of a display panel, the number of data driving integrated circuits included in the data driving part may be decreased. Thus, a manufacturing cost of a display apparatus may be decreased.

In addition, at least one of a graphic processing part and a timing controlling part performs a pivot function without an instruction from an external operating system, in consideration of a load and a driving frequency of the graphic processing part, a delay time of an image display may be decreased.

BRIEF DESCRIPTION OF THE DRAWINGS

The above and other features of the present inventive concept will become better understood by a person of ordinary skill in the art from the description herein below of detailed exemplary embodiments with reference to the accompanying drawings, in which.

DETAILED DESCRIPTION

Hereinafter, the present inventive concept will be explained in detail with reference to the accompanying drawings.

Figure 1:
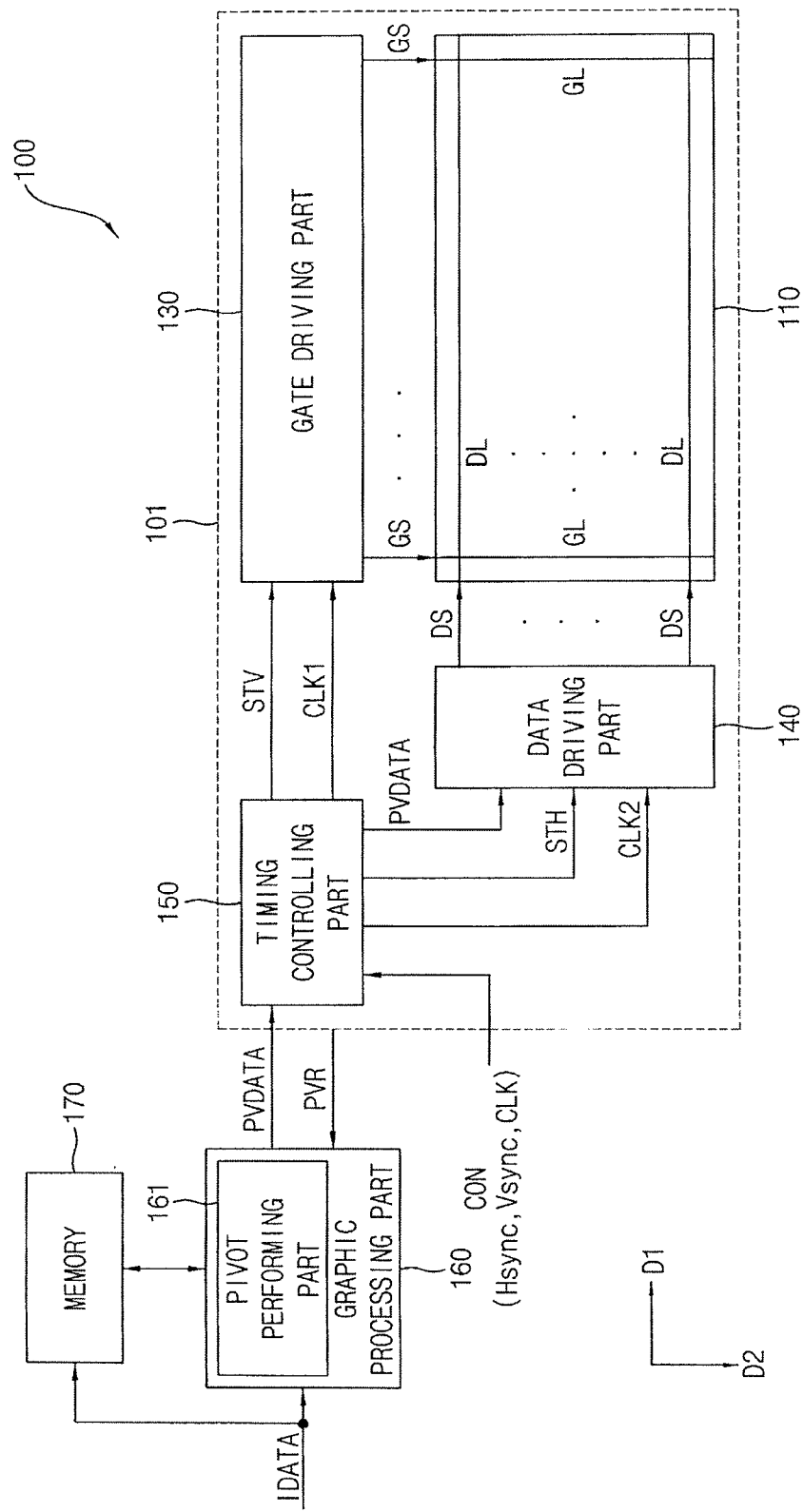
FIG. 1 is a block diagram illustrating a display system according to an exemplary embodiment of the present inventive concept.

FIG. 1 is a block diagram illustrating a display system according to an exemplary embodiment of the present inventive concept.

Referring to FIG. 1, the display system 100 according to the present exemplary embodiment may include a display apparatus 101, a graphic processing part 160 and a memory 170.

The display apparatus 101 may include a display panel 110, a gate driving part 130 e.g. gate driving unit), a data driving part 140 (e.g. data driving unit) and a timing controlling part 150 (e.g. timing controller). Each of the gate driving part 130, data driving part 140 and timing controlling part 150 comprise hardware and each part may have more than one possible structural arrangement. For example, the gate driving part 130 may comprise a gate driver or a gate driving circuit. In addition, the data driving part 140 may comprise, for example, a data driver or a data driving circuit. Still further, the timing controlling part 150 may comprise, for example, a timing controller or a timing control circuit. All of the aforementioned data driving part, gate driving part, and timing controlling part may be realized, for example, by one or more integrated circuits.

The display panel 110 receives a data signal DS from the data driving part 140 to display an image in conjunction with the gate driving part 130 receiving gate signals. The display panel 110 includes gate lines GL that receive gate signals GS, data lines DL that receive data signals, and pixels (not shown). The gate lines GL are arranged in a first direction D1 (shown in FIG. 1) and extend in a second direction D2 substantially perpendicular to the first direction D1. In the particular example shown, the plurality of gate lines GL are arranged from left to right (or vice versa) and each gate line GL extends in a direction substantially perpendicular to the arrangement of the gate lines.

In addition, with continued reference to FIG. 1, the data lines DL are arranged in the second direction D2 and extend in the first direction D1. Here, the first direction D1 may be parallel to a long side of the display panel 110, and the second direction D2 may be parallel to a short side of the display panel 110. For example, the display panel 110 may be a liquid crystal display (LCD) panel including a liquid crystal. In addition, the display panel 110 may be constructed as a touch display panel capable of sensing a touch. In addition, a touch display panel may be capable of detecting "near-touch" proximity-based touch sensing. For example, when a finger or stylus comes within a predetermined distance of a capacitive touch display panel sufficiently close to cause a detectable change in capacitance. An artisan should understand and appreciate that the inventive concept is not limited to capacitive display panels, or touch displays, and proximity sensing may be realized with other constructions than described above.

In addition, a person of ordinary skill in the art should understand and appreciate that the touch display panel is not limited to, for example, a capacitive type touch display, and it is within the inventive concept that a type of the touch display panel may comprise any of a resistive, a surface acoustic wave (SAW), or an infrared type.

The gate driving part 130, the data driving part 140 and the timing controlling part 150 shown in FIG. 1 may be considered to comprise a display panel driving apparatus for driving the display panel 110. However, the inventive concept is not limited to such a configuration.

The gate driving part 130 may be disposed adjacent the long side of the display panel 110. The gate driving part 130 generates the gate signals GS in response to a vertical start signal STV and a first clock signal CLK1 provided from the timing controlling part 150, and outputs the gate signals GS to the gate lines GL. The gate driving part 130 may include, for example, a gate driver or a gate driving circuit.

The data driving part 140 is disposed adjacent the short side of the display panel 110. The data driving part 140 receives pivot image data PVDATA from the timing controlling part 150, generates the data signal DS based on the pivot image data PVDATA, and outputs the data signal DS to the data line DL in response to a horizontal start signal STH and a second clock signal CLK2 provided from the timing controlling part 150. The data driving part 140 may include a data driver or a data driving circuit.

With continued reference to FIG. 1, the timing controlling part 150 receives the pivot image data PVDATA from the graphic processing part 160, and receives a control signal CON from an external source or component. The control signal CON may include a horizontal synchronous signal Hsync, a vertical synchronous signal Vsync and a clock signal CLK. The timing controlling part 150 generates the horizontal start signal STH using the horizontal synchronous signal Hsync and outputs the horizontal start signal STH to the data driving part 140. In addition, the timing controlling part 150 generates the vertical start signal STV using the vertical synchronous signal Vsync and outputs the vertical start signal STV to the gate driving part 130. In addition, the timing controlling part 150 generates the first clock signal CLK1 and the second clock signal CLK2 based on receiving the clock signal CLK as part of the control signal CON, outputs the first clock signal CLK1 to the gate driving part 130, and outputs the second clock signal CLK2 to the data driving part 140. The timing controlling part 150 may include a timing controller or a timing controlling circuit.

The graphic processing part 160 receives image data IDATA. The graphic processing part 160 processes the image data IDATA. The graphic processing part 160 includes a pivot performing part 161. The pivot performing part 161 performs a pivot function which rotates the display of the image, for example, by about 90 degrees on the image data IDATA, and outputs the pivoted image data PVDATA to the timing controlling part 150. The graphic processing part 160 may perform the pivot function in response to a pivot request data PVR received from the display apparatus 101. The pivot request data PVR may be part of an Extended Display Identification Data (EDID). The graphic processing part 160 may receive, from the memory 170, the image data IDATA stored in the memory 170, and may perform the pivot function on the image data IDATA. The graphic processing part 160 may include at least one of a graphic processor, a graphic processing unit and a graphic processing circuit. In addition, the pivot performing part 161 may include a pivot circuit for performing the pivot function.

With continued reference to FIG. 1, the memory 170 receives the image data IDATA and stores the image data IDATA.

Figure 2:
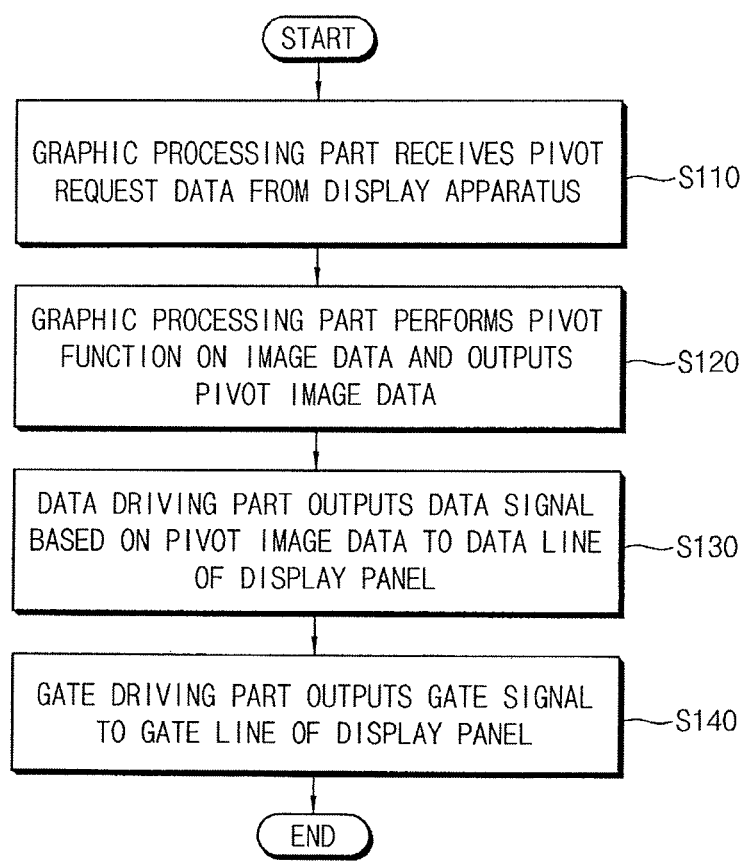
FIG. 2 is a flowchart illustrating a method of driving the display system of FIG. 1.

FIG. 2 is a flowchart illustrating an example of a method of driving the display system 100 of FIG. 1. A person of ordinary skill in the art should understand and appreciate that the inventive concept is not limited to the operations in the flowchart.

Referring to FIGS. 1 and 2, at operation S110, the graphic processing part 160 receives the pivot request data PVR from the display apparatus 101. More specifically, the graphic processing part 160 receives the pivot request data PVR from the display apparatus 101 including the display panel 110, the gate driving part 130, the data driving part 140 and the timing controlling part 150. The pivot request data PVR may be, for example, an Extended Display Identification Data (EDID) or a part of the EDID.

At operation S120, the graphic processing part 160 performs the pivot function on the image data IDATA and outputs the pivot image data PVDATA to the timing controlling part 150. More specifically, the graphic processing part 160 includes the pivot performing part 161. The pivot performing part 161 performs the pivot function which rotates the image by about 90 degrees on the image data IDATA, and outputs the pivot image data PVDATA. The graphic processing part 160 may perform the pivot function in response to the pivot request data PVR being received from the display apparatus 101. The graphic processing part 160 may receive, from the memory 170, the image data IDATA stored in the memory 170, and may perform the pivot function on the image data IDATA.

At operation S130, the data driving part 140 outputs the data signal DS based on the pivot image data PVDATA to the data lines DL of the display panel 110. More specifically, the graphic processing part 160 outputs the pivot image data PVDATA to the timing controlling part 150. The timing controlling part 150 outputs the pivot image data PVDATA to the data driving part 140. The data driving part 140 receives the pivot image data PVDATA from the timing controlling part 150, generates the data signal DS based on the pivot image data PVDATA, and outputs the data signal DS to the data lines DL in response to the horizontal start signal STH and the second clock signal CLK2 provided from the timing controlling part 150.

At operation (S140), the gate driving part 130 outputs the gate signal GS to the gate line GL of the display panel 110. Specifically, the gate driving part 130 generates the gate signals GS in response to the vertical start signal STV and the first clock signal CLK1 provided from the timing controlling part 150, and outputs the gate signals GS to the gate lines GL.

According to the present exemplary embodiment of the inventive concept, as the data driving part 140 is disposed adjacent the short side of the display panel 110, the number of data driving integrated circuits included in the data driving part 140 may be decreased. Accordingly, a manufacturing cost of the display apparatus 101 may be decreased.

In addition, the graphic processing part 160 performs the pivot function in response to the pivot request data PVR output from the display apparatus 101, and thus the graphic processing part 160 may perform the pivot function without an instruction from an external operating system.

Figure 3:
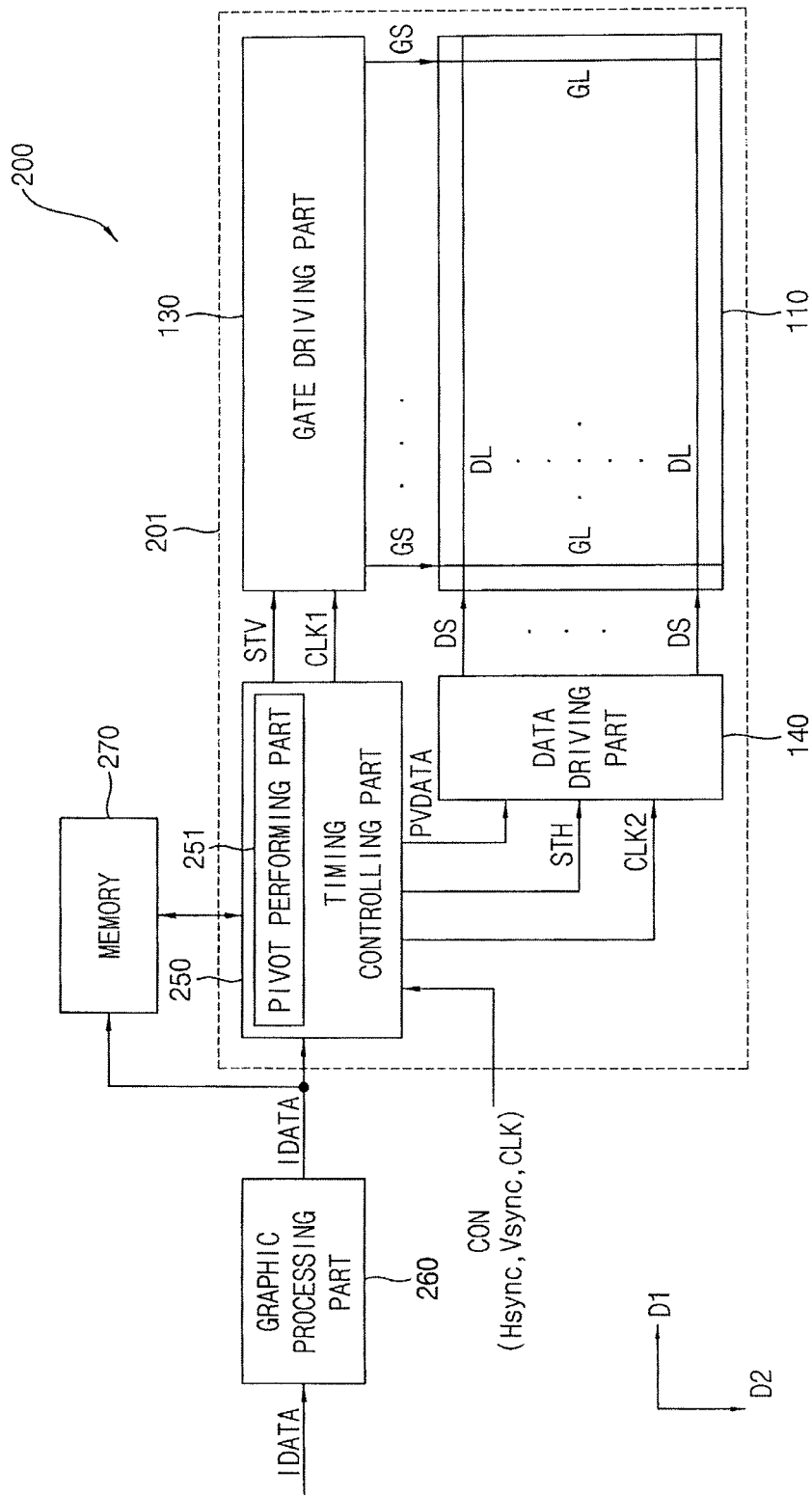
FIG. 3 is a block diagram illustrating a display system according to an exemplary embodiment of the present inventive concept.

FIG. 3 is a block diagram illustrating a display system according to an exemplary embodiment of the present inventive concept.

The display system 200 according to the present exemplary embodiment illustrated in FIG. 3 may be substantially similar to the display system 100 according to the previous exemplary embodiment illustrated in FIG. 1, except for a display apparatus 201, a timing controlling part 250, a graphic processing part 260 and a memory 270. Thus, the same reference numerals will be used to refer to the same or similar parts as those described in the previous exemplary embodiment and any further repetitive explanation concerning the above elements will be omitted.

Referring to FIG. 3, the display system 200 according to the present exemplary embodiment includes the display apparatus 201, the graphic processing part 260 and the memory 270. In comparison with the structure of FIG. 1, the pivot performing part 251 in FIG. 3 is arranged as part of the timing control part 250, rather than being included in the graphics processing part 160 as shown in FIG. 1.

The gate driving part 130 is disposed adjacent the long side of the display panel 110. The gate driving part 130 generates the gate signals GS in response to the vertical start signal STV and the first clock signal CLK1 provided from the timing controlling part 250, and outputs the gate signals GS to the gate lines GL.

The data driving part 140 is disposed adjacent the short side of the display panel 110. The data driving part 140 receives the pivot image data PVDATA from the timing controlling part 250, generates the data signal DS based on the pivot image data PVDATA, and outputs the data signal DS to the data line DL in response to the horizontal start signal STH and the second clock signal CLK2 provided from the timing controlling part 250.

The timing controlling part 250 receives the image data IDATA from the graphic processing part 260, and receives the control signal CON from an external component or source. The control signal CON may include, for example, the horizontal synchronous signal Hsync, the vertical synchronous signal Vsync and the clock signal CLK. The timing controlling part 250 generates the horizontal start signal STH using the horizontal synchronous signal Hsync and outputs the horizontal start signal STH to the data driving part 140. In addition, the timing controlling part 250 generates the vertical start signal STV using the vertical synchronous signal Vsync and outputs the vertical start signal STV to the gate driving part 130. In addition, the timing controlling part 250 generates the first clock signal CLK1 and the second clock signal CLK2 using the clock signal CLK, outputs the first clock signal CLK1 to the gate driving part 130, and outputs the second clock signal CLK2 to the data driving part 140.

In this embodiment of the inventive concept, the timing controlling part 250 includes a pivot performing part 251. As discussed above, the pivot performing part may include a pivot circuit that performs the pivot function, and such structure may be arranged in the timing controlling part 250 shown in FIG. 3. The pivot performing part 251 performs the pivot function on the image data IDATA, and outputs the pivot image data PVDATA to the data driving part 140. The timing controlling part 250 may receive, from the memory 270, the image data IDATA stored in the memory 270, and may perform the pivot function on the image data IDATA.

The graphic processing part 260 receives the image data IDATA and outputs the image data IDATA to the timing controlling part 250. According to an exemplary embodiment, the graphic processing part 260 shown in FIG. 3 may be omitted. In such a case, the timing controlling part 250 may receive the image data IDATA from the external source or component, rather than via the graphic processing part 260.

The memory 270 receives the image data IDATA and stores the image data IDATA. The memory 270 may receive the image data IDATA from the graphic processing part 260 or from the external source or component.

Figure 4:
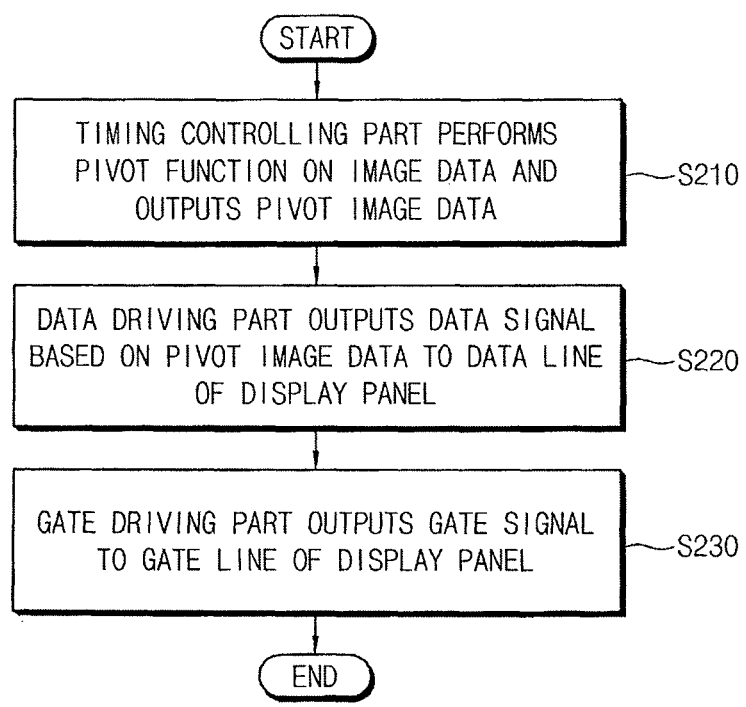
FIG. 4 is a flowchart illustrating a method of driving the display system of FIG. 3.

FIG. 4 is a flowchart illustrating a method of driving the display system 200 of FIG. 3.

Referring to FIGS. 3 and 4, at operation (S210) the timing controlling part 250 performs the pivot function on the image data IDATA and outputs the pivot image data PVDATA to the data driving part 140. More specifically, the timing controlling part 250 may includes the pivot performing part 251. The pivot performing part 251 performs the pivot function on the image data IDATA, and outputs the pivot image data PVDATA to the data driving part 140. The timing controlling part 250 may receive, from the memory 270, the image data IDATA stored in the memory 270, and may perform the pivot function on the image data IDATA.

At operation (S220), the data driving part 140 outputs the data signal DS based on the pivot image data PVDATA to the data line DL of the display panel 110. Specifically, the data driving part 140 receives the pivot image data PVDATA from the timing controlling part 250, generates the data signal DS based on the pivot image data PVDATA, and outputs the data signal DS to the data line DL in response to the horizontal start signal STH and the second clock signal CLK2 provided from the timing controlling part 250.

At operation (230), the gate driving part 130 outputs the gate signal GS to the gate line GL of the display panel 110. More specifically, the gate driving part 130 generates the gate signals GS in response to the vertical start signal STV and the first clock signal CLK1 provided from the timing controlling part 250, and outputs the gate signals GS to the gate lines GL.

According to the present exemplary embodiment, since the data driving part 140 is disposed adjacent the short side of the display panel 110, the number of data driving integrated circuits included in the data driving part 140 may be decreased. Thus, a manufacturing cost of the display apparatus 201 may be decreased.

In addition, the timing controlling part 250 performs the pivot function, and thus the timing controlling part 250 may perform the pivot function without an instruction from an external operating system. Thus, a delay time of an image display may be decreased.

Figure 5:
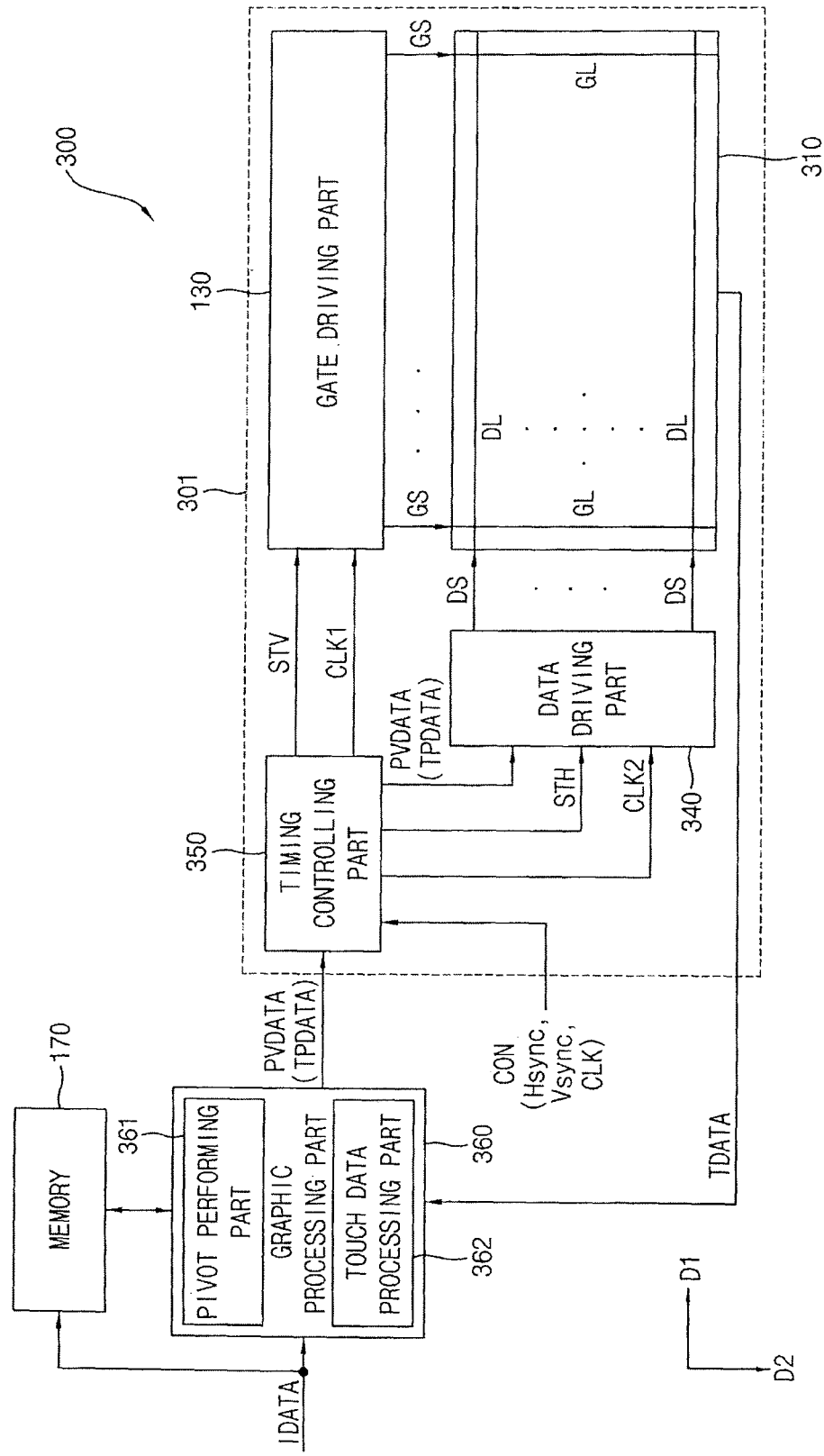
FIG. 5 is a block diagram illustrating a display system according to an exemplary embodiment of the present inventive concept.

FIG. 5 is a block diagram illustrating a display system according to an exemplary embodiment of the present inventive concept.

The display system 300 according to the present exemplary embodiment illustrated in FIG. 5 may be substantially the same as the display system 100 according to the previous exemplary embodiment illustrated in FIG. 1 except for a display apparatus 301, a display panel 310, a data driving part 340, a timing controlling part 350 and a graphic processing part 360. Thus, the same reference numerals will be used to refer to same or like parts as those described in the previous exemplary embodiment and any further repetitive explanation concerning the above elements will be omitted.

Referring to FIG. 5, the display system 300 according to the present exemplary embodiment includes the display apparatus 301, the graphic processing part 360 and the memory 170.

The display apparatus 301 includes the display panel 310, the gate driving part 130, the data driving part 340 and the timing controlling part 350. In this configuration, the display panel includes a touch display.

The display panel 310 may be substantially the same as the display panel 110 according to the previous exemplary embodiment illustrated in FIG. 1. Thus, the display panel 310 receives the data signal DS from the data driving part 340 to display an image, and the data driving part is arranged adjacent a short side of the display panel 310. The display panel 310 may be a touch display panel capable of sensing a touch. The display panel 310 outputs touch data TDATA to the graphic processing part 360 when a touch is generated on the display panel 310.

The gate driving part 130, the data driving part 340 and the timing controlling part 350 may be defined as a display panel driving apparatus for driving the display panel 310.

The gate driving part 130 is disposed adjacent a long side of the display panel 310, similar to the configurations in FIGS. 1 and 3. The gate driving part 130 generates the gate signals GS in response to the vertical start signal STV and the first clock signal CLK1 provided from the timing controlling part 350, and outputs the gate signals GS to the gate lines GL.

The data driving part 340 is disposed adjacent a short side of the display panel 310. The data driving part 340 receives the pivot image data PVDATA from the timing controlling part 350, generates the data signal DS based on the pivot image data PVDATA, and outputs the data signal DS to the data line DL in response to the horizontal start signal STH and the second clock signal CLK2 provided from the timing controlling part 350.

The timing controlling part 350 receives the pivot image data PVDATA output from the graphic processing part 360, and receives the control signal CON from an external source or component. The control signal CON may include the horizontal synchronous signal Hsync, the vertical synchronous signal Vsync and the clock signal CLK. The timing controlling part 350 generates the horizontal start signal STH using the horizontal synchronous signal Hsync and outputs the horizontal start signal STH to the data driving part 340. In addition, the timing controlling part 350 generates the vertical start signal STV using the vertical synchronous signal Vsync and outputs the vertical start signal STV to the gate driving part 130. In addition, the timing controlling part 350 generates the first clock signal CLK1 and the second clock signal CLK2 using the clock signal CLK received via the control signal, outputs a first clock signal CLK1 to the gate driving part 130, and outputs a second clock signal CLK2 to the data driving part 340.

The graphic processing part 360 includes a touch data processing part 362 and a pivot performing part 361.

The touch data processing part 362 receives the touch data TDATA from the display panel 310. The touch data processing part 362 processes the touch data TDATA and outputs touch process data TPDATA for displaying an image related to the touch on the display panel 310. The TPDATA output by the touch data processing part 362 is received by the timing control part 350, and is in turn output to the data driving part 340.

The pivot performing part 361 performs the pivot function which rotates the image by about 90 degrees on the image data IDATA, and outputs the pivot image data PVDATA to the timing controlling part 350. The pivot image data PVDATA may include the touch process data TPDATA. The graphic processing part 360 may perform the pivot function in response to the touch data TDATA received from the display apparatus 301. Thus, the touch data TDATA may be in the pivot request data PVR according to the previous exemplary embodiment illustrated in FIG. 1. The graphic processing part 360 may receive, from the memory 170, the image data IDATA stored in the memory 170, and may perform the pivot function on the image data IDATA.

Figure 6:
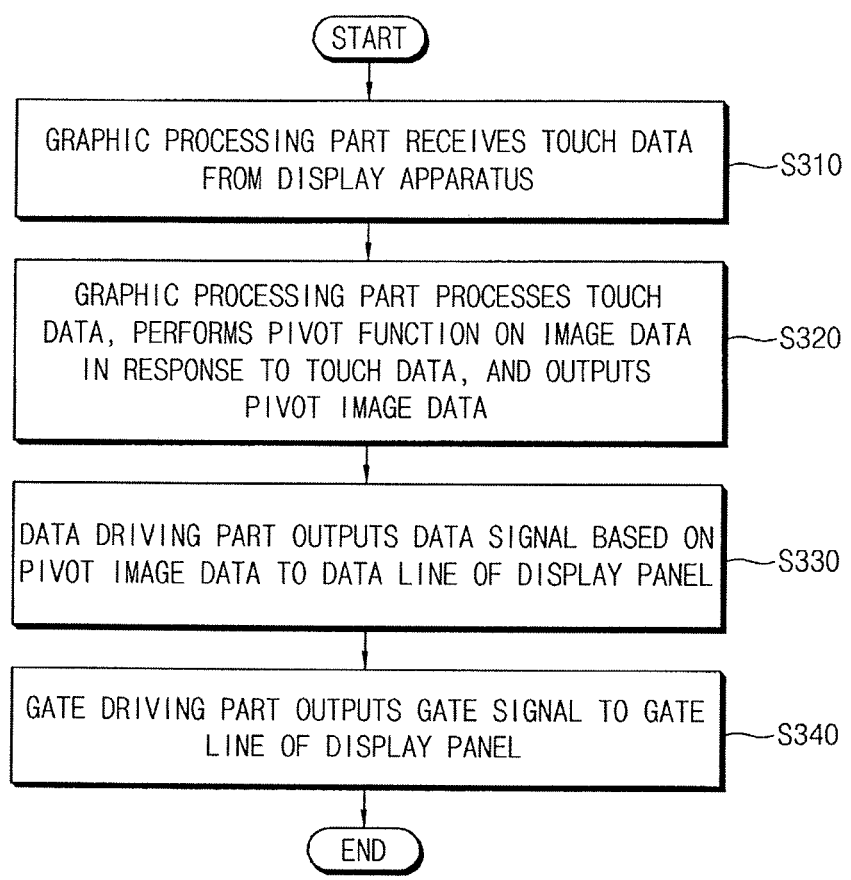
FIG. 6 is a flowchart illustrating a method of driving the display system of FIG. 5.

FIG. 6 is a flowchart illustrating a method of driving the display system 300 of FIG. 5.

Referring to FIGS. 5 and 6, at operation (S310), the graphic processing part 360 receives the touch data TDATA from the display panel 310. For example, the display panel 310 outputs the touch data TDATA indicating a sense of the touch when the touch is generated on the display panel 310. The touch data processing part 362 of the graphic processing part 360 receives the touch data TDATA from the display panel 310.

At operation (S320), the graphic processing part 360 processes the touch data TDATA, performs the pivot function on the image data IDATA in response to the touch data TDATA, and outputs the pivot image data PVDATA. More specifically, in this configuration the graphic processing part 360 includes the touch data processing part 362 and the pivot performing part 361. The touch data processing part 362 processes the touch data TDATA and outputs the touch process data TPDATA for displaying the image related to the touch on the display panel 310. The pivot performing part 361 performs the pivot function on the image data IDATA, and outputs the pivot image data PVDATA to the timing controlling part 350. The pivot image data PVDATA may include the touch process data TPDATA. The graphic processing part 360 may perform the pivot function in response to the touch data TDATA received from the display apparatus 301. Thus, for example, in the case where a user desires to have the apparatus manipulate the display of an image. The graphic processing part 360 may receive, from the memory 170, the image data IDATA stored in the memory 170, and may perform the pivot function on the image data IDATA.

At (S330), the data driving part 340 outputs the data signal DS based on the pivot image data PVDATA to the data line DL of the display panel 310. More specifically, the data driving part 340 receives the pivot image data PVDATA from the timing controlling part 350, generates the data signal DS based on the pivot image data PVDATA, and outputs the data signal DS to the data line DL in response to the horizontal start signal STH and the second clock signal CLK2 provided from the timing controlling part 350.

At (s340), the gate driving part 130 outputs the gate signal GS to the gate line GL of the display panel 310. More specifically, the gate driving part 130 generates the gate signals GS in response to the vertical start signal STV and the first clock signal CLK1 provided from the timing controlling part 350, and outputs the gate signals GS to the gate lines GL.

Figure 7:
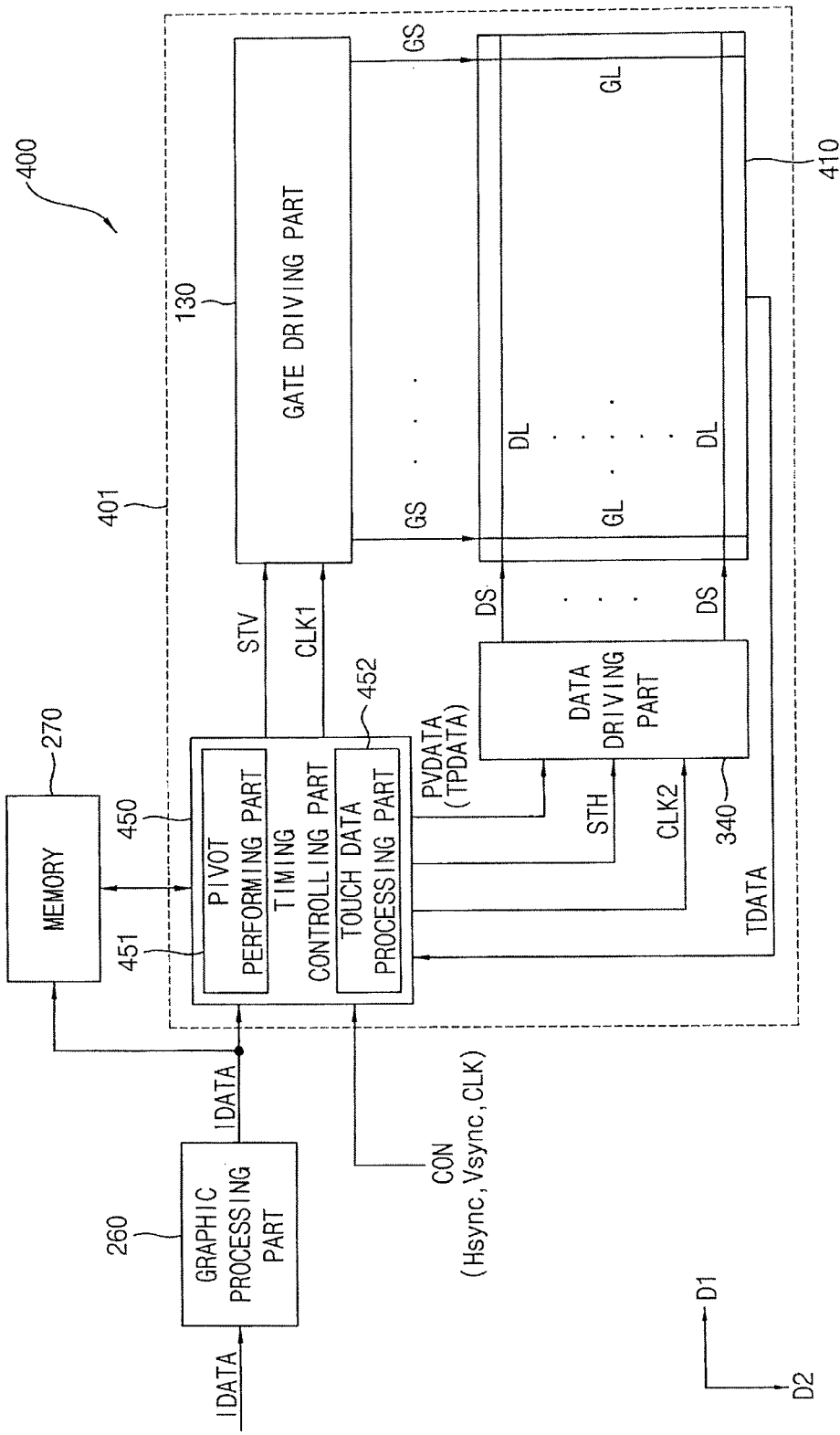
FIG. 7 is a block diagram illustrating a display system according to an exemplary embodiment of the present inventive concept.

According to the present exemplary embodiment, since the data driving part 340 is disposed adjacent the short side of the display panel 310, the number of data driving integrated circuits included in the data driving part 340 may be decreased. Thus, a manufacturing cost of the display apparatus 301 may be decreased. In addition, the pivot of the display may being performed substantially at the component level of the graphics processing part, timing control part, data driving part and gate driving part. FIG. 7 is a block diagram illustrating a display system according to an exemplary embodiment of the present inventive concept.

The display system 400 according to the present exemplary embodiment illustrated in FIG. 7 may be substantially similar or the same as the display system 100 according to the configuration illustrated in FIG. 1 except for a display apparatus 401, a display panel 410, a data driving part 340, a timing controlling part 450, a graphic processing part 260 and a memory 270. Thus, the same reference numerals will be used to refer to same or like parts as those described in the previous exemplary embodiment and any further repetitive explanation concerning the above elements will be omitted.

Referring now to FIG. 7, the display system 400 according to the present exemplary embodiment includes the display apparatus 401, the graphic processing part 260 and the memory 270.

The display apparatus 401 includes the display panel 410, the gate driving part 130, the data driving part 340 and the timing controlling part 450.

The display panel 410 may be substantially the same as the display panel 110 according to the previous exemplary embodiment illustrated in FIG. 1. Thus, the display panel 410 receives the data signal DS from the data driving part 340 to display an image. The display panel 410 may be a touch display panel capable of sensing a touch. In the case where the display panel is a touch display panel, the display panel 410 outputs, for example, the touch data TDATA to the timing controlling part 450 when a touch is generated on the display panel 410.

With continued reference to FIG. 7, the gate driving part 130, the data driving part 340 and the timing controlling part 450 may be defined as a display panel driving apparatus for driving the display panel 410.

The gate driving part 130 is disposed adjacent a long side of the display panel 410. The gate driving part 130 generates the gate signals GS in response to the vertical start signal STV and the first clock signal CLK1 provided from the timing controlling part 450, and outputs the gate signals GS to the gate lines GL.

The data driving part 340 is disposed adjacent a short side of the display panel 410. The data driving part 340 receives the pivot image data PVDATA from the timing controlling part 450, generates the data signal DS based on the pivot image data PVDATA, and outputs the data signal DS to the data line DL in response to the horizontal start signal STH and the second clock signal CLK2 provided from the timing controlling part 450.

As shown in FIG. 7, the timing controlling part 450 receives the image data IDATA from the graphic processing part 260, and receives the control signal CON from an external source or component. The control signal CON may include the horizontal synchronous signal Hsync, the vertical synchronous signal Vsync and the clock signal CLK. The timing controlling part 450 generates the horizontal start signal STH using the horizontal synchronous signal Hsync and outputs the horizontal start signal STH to the data driving part 340. In addition, the timing controlling part 450 generates the vertical start signal STV using the vertical synchronous signal Vsync and outputs the vertical start signal STV to the gate driving part 130. In addition, the timing controlling part 450 generates the first clock signal CLK1 and the second clock signal CLK2 using the clock signal CLK, outputs the first clock signal CLK1 to the gate driving part 130, and outputs the second clock signal CLK2 to the data driving part 340.

The timing controlling part 450 includes a touch data processing part 452 and a pivot performing part 451.

The touch data processing part 452 receives the touch data TDATA from the display panel 410. The touch data processing part 452 processes the touch data TDATA and outputs the touch process data TPDATA for displaying an image related to the touch on the display panel 410.

The pivot performing part 451 performs the pivot function which rotates the image by about 90 degrees on the image data IDATA, and outputs the pivot image data PVDATA to the data driving part 340. The pivot image data PVDATA may include the touch process data TPDATA. The timing controlling part 450 may performs the pivot function in response to the touch data TDATA received from the display panel 410. The timing controlling part 450 may receive, from the memory 270, the image data IDATA stored in the memory 270, and may perform the pivot function on the image data IDATA.

The graphic processing part 260 receives the image data from an external source, and outputs the image data IDATA to the timing controlling part 450. According to an embodiment, the graphic processing part 260 may be omitted. In such a case, the timing controlling part 450 may receive the image data IDATA from the external source or an interface instead of the IDATA being first transmitted to the graphic processing part. It is also within the inventive concept that there may be a switch (not shown), which may be software controlled, that can provide the IDATA to the graphic processing part, or bypass the graphic processing part and provide the IDATA to the timing controlling part from the external source or an interface.

The memory 270 receives the image data IDATA and stores the image data IDATA. The memory 270 may receive the image data IDATA from the graphic processing part 260 or the outside.

Figure 8:
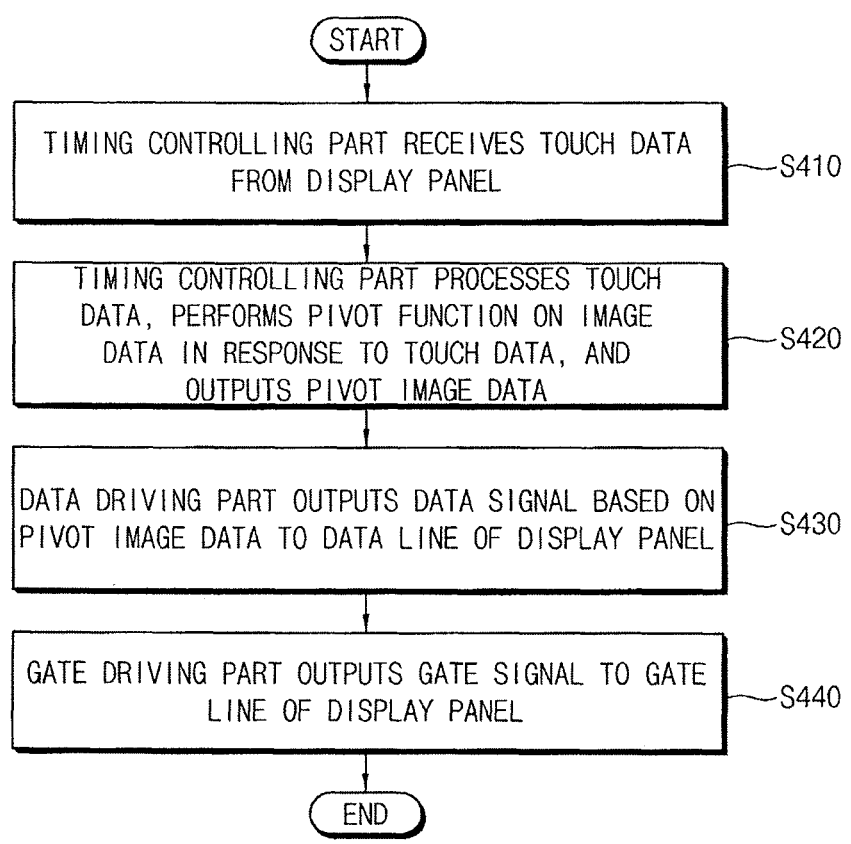
FIG. 8 is a flowchart illustrating a method of driving the display system of FIG. 7.

FIG. 8 is a flowchart illustrating a method of driving the display system 400 of FIG. 7.

Referring to FIGS. 7 and 8, at operation (S410), the timing controlling part 450 receives the touch data TDATA from the display panel 410. More specifically, the display panel 410 may have sensing lines in (e.g. which may be arranged in a grid) that detect a location of a touch generated in a display area, for example, by a finger or a stylus, and outputs a data signal comprising the touch data TDATA. The touch data processing part 452 of the timing controlling part 450 receives the touch data TDATA from the display panel 410.

At operation (S420), the timing controlling part 450 processes the touch data TDATA, performs the pivot function on the image data IDATA in response to the touch data TDATA, and outputs the pivot image data PVDATA. Specifically, the timing controlling part 450 includes the touch data processing part 452 and the pivot performing part 451. The touch data processing part 452 processes the touch data TDATA and outputs the touch process data TPDATA for displaying the image related to the touch on the display panel 410. The pivot performing part 451 performs the pivot function on the image data IDATA, and outputs the pivot image data PVDATA to the data driving part 340. The pivot image data PVDATA may include the touch process data TPDATA. The timing controlling part 450 may performs the pivot function in response to the touch data TDATA received from the display panel 410. The timing controlling part 450 may receive, from the memory 270, the image data IDATA stored in the memory 270, and may perform the pivot function on the image data IDATA.

At operation (S430), the data driving part 340 outputs the data signal DS based on the pivot image data PVDATA to the data line DL of the display panel 410. Specifically, the data driving part 340 receives the pivot image data PVDATA from the timing controlling part 450, generates the data signal DS based on the pivot image data PVDATA, and outputs the data signal DS to the data line DL in response to the horizontal start signal STH and the second clock signal CLK2 provided from the timing controlling part 450.

At operation (S440), the gate driving part 130 outputs the gate signal GS to the gate line GL of the display panel 410. Specifically, the gate driving part 130 generates the gate signals GS in response to the vertical start signal STV and the first clock signal CLK1 provided from the timing controlling part 450, and outputs the gate signals GS to the gate lines GL.

According to the present exemplary embodiment, since the data driving part 340 is disposed adjacent the short side of the display panel 410, the number of data driving integrated circuits included in the data driving part 340 may be decreased. Thus, a manufacturing cost of the display apparatus 401 may be decreased.

In addition, the timing controlling part 450 performs the pivot function of the image, and thus the timing controlling part 450 may perform the pivot function without an instruction from an external operating system. Thus, a delay time of an image display may be decreased.

Figure 9:
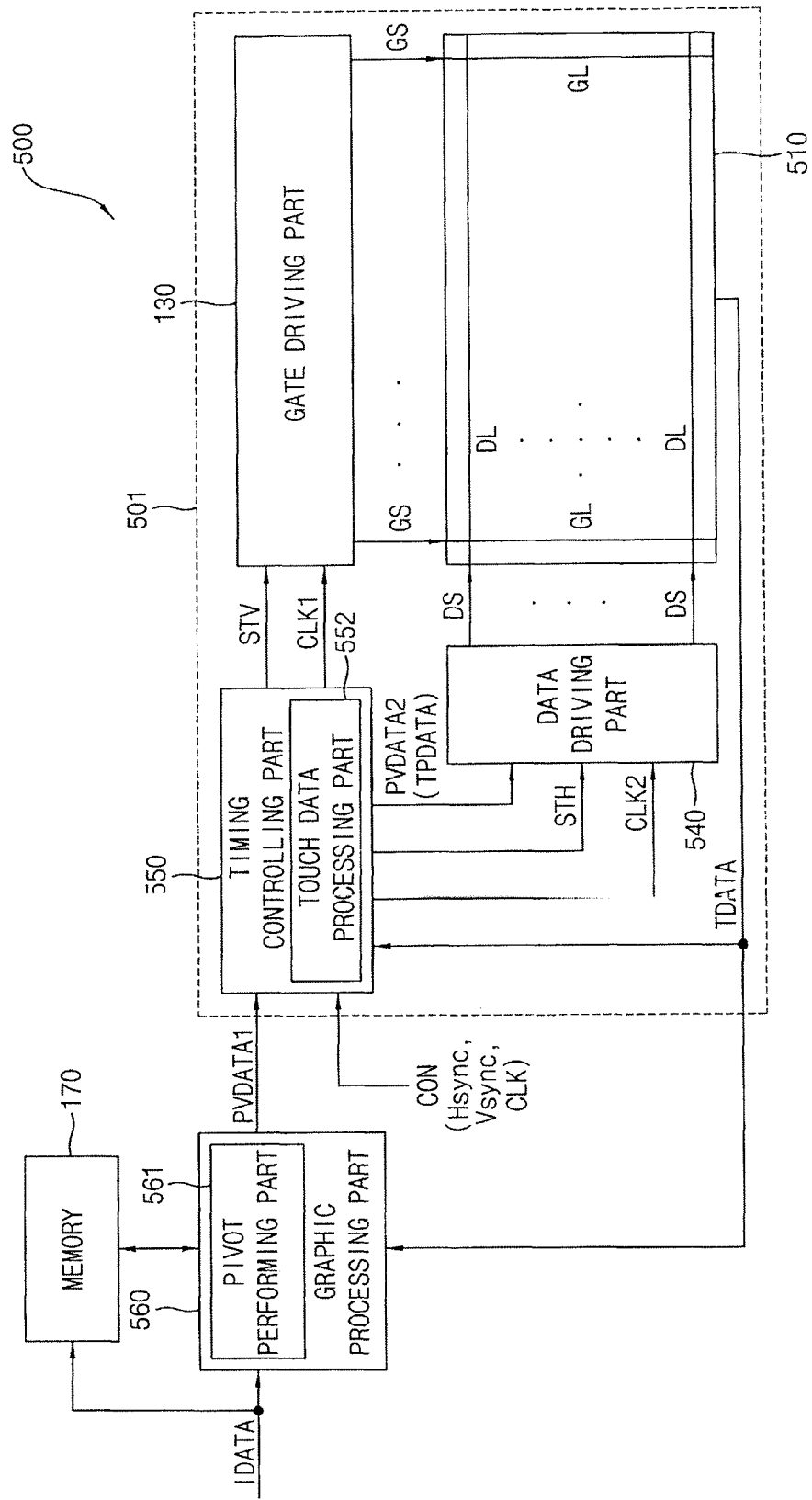
FIG. 9 is a block diagram illustrating a display system according to an exemplary embodiment of the present inventive concept.

FIG. 9 is a block diagram illustrating a display system according to an exemplary embodiment of the present inventive concept.

The display system 500 according to the present exemplary embodiment illustrated in FIG. 9 may be substantially similar or the same as the configuration of the display system 100 according to the previous exemplary embodiment illustrated in FIG. 1 except for a display apparatus 501, a display panel 510, a data driving part 540, a timing controlling part 550 and a graphic processing part 560. Thus, the same reference numerals will be used to refer to the same or similar parts as those described in the previous exemplary embodiment and any further repetitive explanation concerning the above elements may be omitted.

Referring to FIG. 9, the display system 500 according to the present exemplary embodiment may include the display apparatus 501, the graphic processing part 560 and the memory 170.

The display apparatus 501 includes the display panel 510, the gate driving part 130, the data driving part 540 and the timing controlling part 550.

The display panel 510 may be substantially the same as the display panel 110 according to the previous exemplary embodiment illustrated in FIG. 1. For example, the display panel 510 receives the data signal DS from the data driving part 540 to display an image. The display panel 510 may be a touch display panel capable of sensing a touch. The display panel 510 outputs the touch data TDATA to the graphic processing part 560 and the timing controlling part 550 when a touch is generated on the display panel 510.

The gate driving part 130, the data driving part 540 and the timing controlling part 550 may be collectively referred to as a display panel driving apparatus for driving the display panel 510.

The gate driving part 130 is disposed adjacent a long side of the display panel 510. The gate driving part 130 generates the gate signals GS in response to the vertical start signal STV and the first clock signal CLK1 provided from the timing controlling part 550, and outputs the gate signals GS to the gate lines GL.

With continued reference to FIG. 9, the data driving part 540 is disposed adjacent a short side of the display panel 510. The data driving part 540 receives the second pivot image data PVDATA2 from the timing controlling part 550, generates the data signal DS based on the second pivot image data PVDATA2, and outputs the data signal DS to the data line DL in response to the horizontal start signal STH and the second clock signal CLK2 provided from the timing controlling part 550.

The timing controlling part 550 receives first pivot image data PDATA1 from the graphic processing part 560, and receives the control signal CON from an external source or component. The control signal CON may include the horizontal synchronous signal Hsync, the vertical synchronous signal Vsync and the clock signal CLK. The timing controlling part 550 generates the horizontal start signal STH using the horizontal synchronous signal Hsync and outputs the horizontal start signal STH to the data driving part 540. In addition, the timing controlling part 550 generates the vertical start signal STV using the vertical synchronous signal Vsync and outputs the vertical start signal STV to the gate driving part 130. In addition, the timing controlling part 550 generates the first clock signal CLK1 and the second clock signal CLK2 using the clock signal CLK, outputs the first clock signal CLK1 to the gate driving part 130, and outputs the second clock signal CLK2 to the data driving part 540.

The timing controlling part 550 includes a touch data processing part 552. The touch data processing part 552 receives the touch data TDATA from the display panel 510. The touch data processing part 552 processes the touch data TDATA and outputs the touch process data TPDATA for displaying an image related to the touch on the display panel 510. Thus, the second pivot image data PVDATA2 output from the timing controlling part 550 may include first pivot image data PVDATA1 and the touch process data TPDATA.

The graphic processing part 560 includes a pivot performing part 561. The pivot performing part 561 performs the pivot function which rotates the image by about 90 degrees on the image data IDATA, and outputs the first pivot image data PVDATA1 to the timing controlling part 550. The graphic processing part 560 may performs the pivot function in response to the touch data TDATA received from the display apparatus 501. Accordingly, the touch data TDATA may be in the pivot request data PVR according to a previous exemplary embodiment. The graphic processing part 560 may receive, from the memory 170, the image data IDATA stored in the memory 170, and may perform the pivot function on the image data IDATA.

Figure 10:
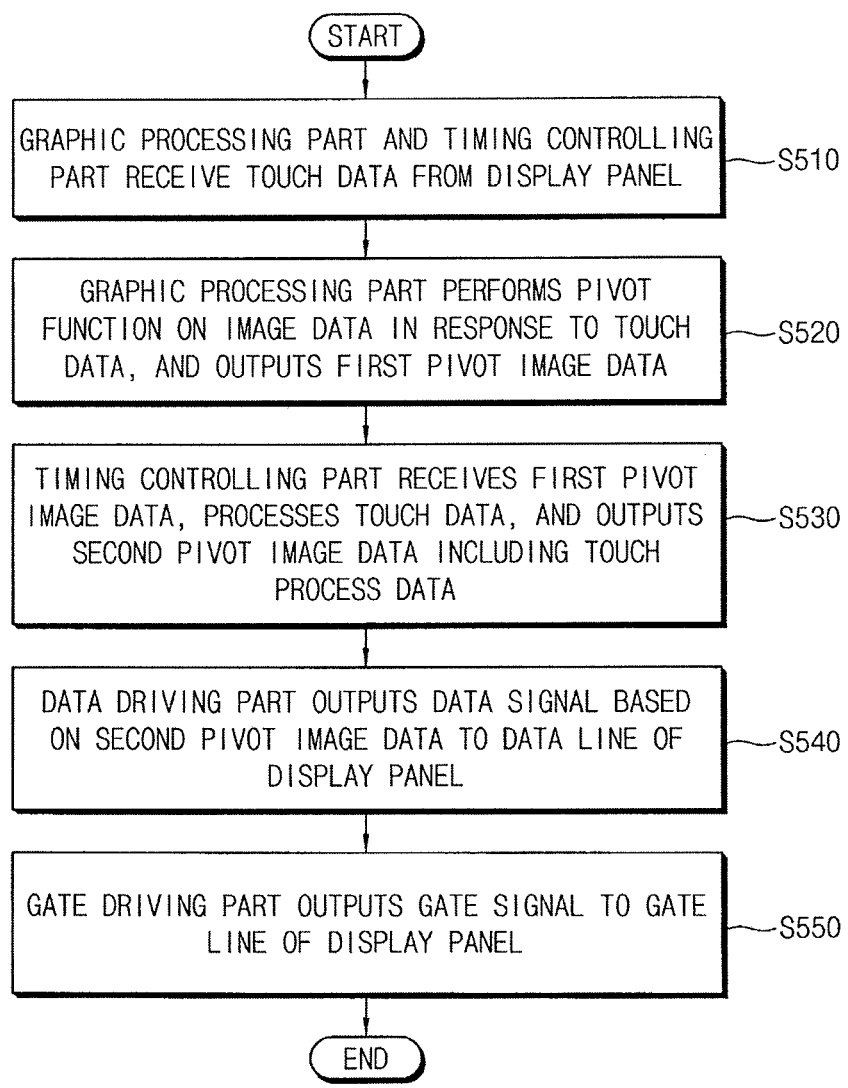
FIG. 10 is a flowchart illustrating a method of driving the display system of FIG. 9.

FIG. 10 is a flowchart illustrating a method of driving the display system 500 of FIG. 9.

Referring to FIGS. 9 and 10, at operation (S510), the graphic processing part 560 and the timing controlling part 550 receives the touch data TDATA from the display panel 510. More specifically, the display panel 510 outputs the touch data TDATA indicating a sense of the touch when the touch is generated on the display panel 510. The pivot performing part 561 of the graphic processing part 560 receives the touch data TDATA from the display panel 510, and the touch data processing part 552 of the timing controlling part 550 receives the touch data TDATA from the display panel 510.

At operation (S520), the graphic processing part 560 performs the pivot function on the image data IDATA in response to the touch data TDATA, and outputs the first pivot image data PVDATA1. More specifically, the graphic processing part 560 includes the pivot performing part 561. The pivot performing part 561 performs the pivot function on the image data IDATA, and outputs the first pivot image data PVDATA1 to the timing controlling part 550. The graphic processing part 560 may performs the pivot function in response to the touch data TDATA received from the display apparatus 501. The graphic processing part 560 may receive, from the memory 170, the image data IDATA stored in the memory 170, and may perform the pivot function on the image data IDATA.

At operation (S530), the timing controlling part 550 receives the first pivot image data PVDATA1, processes the touch data TDATA, and outputs the second pivot image data PVDATA2 including the touch process data TPDATA. More specifically, the timing controlling part 550 includes the touch data processing part 552. The touch data processing part 552 receives the touch data TDATA from the display panel 510. The touch data processing part 552 processes the touch data TDATA and outputs the touch process data TPDATA for displaying the image related to the touch on the display panel 510. For example, the second pivot image data PVDATA2 output from the timing controlling part 550 may include first pivot image data PVDATA1 and the touch process data TPDATA.

At operation (S540), the data driving part 540 outputs the data signal DS based on the second pivot image data PVDATA2 to the data line DL of the display panel 510. More specifically, the data driving part 540 receives the second pivot image data PVDATA2 from the timing controlling part 550, generates the data signal DS based on the second pivot image data PVDATA2, and outputs the data signal DS to the data line DL in response to the horizontal start signal STH and the second clock signal CLK2 provided from the timing controlling part 550.

At operation (S550), the gate driving part 130 outputs the gate signal GS to the gate line GL of the display panel 510. More specifically, the gate driving part 130 generates the gate signals GS in response to the vertical start signal STV and the first clock signal CLK1 provided from the timing controlling part 550, and outputs the gate signals GS to the gate lines GL.

According to the present exemplary embodiment, since the data driving part 540 is disposed adjacent the short side of the display panel 510, the number of data driving integrated circuits included in the data driving part 540 may be decreased. Thus, a manufacturing cost of the display apparatus 501 may be decreased.

In addition, the graphic processing part 560 performs the pivot function and the timing controlling part 550 processes the touch data TDATA, and thus a load of the graphic processing part 560 may be decreased. Thus, a delay time of an image display may be decreased.

Figure 11:
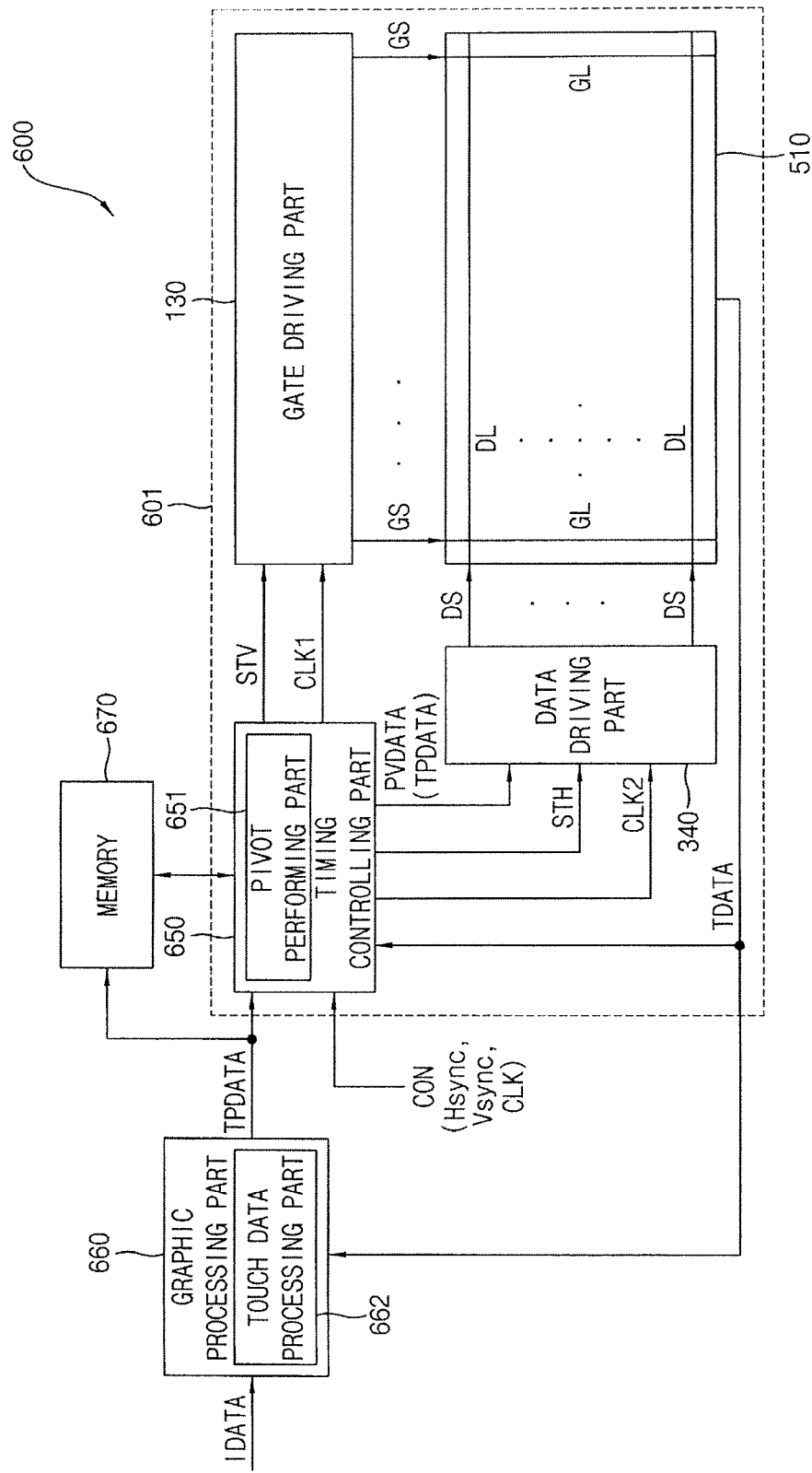
FIG. 11 is a block diagram illustrating a display system according to an exemplary embodiment of the present inventive concept.

FIG. 11 is a block diagram illustrating a display system according to an exemplary embodiment of the present inventive concept.

The display system 600 according to the present exemplary embodiment illustrated in FIG. 11 may be substantially similar or the same as the display system 100 according to the previous exemplary embodiment illustrated in FIG. 1 except for a display apparatus 601, a display panel 510, a data driving part 340, a timing controlling part 650, a graphic processing part 660 and a memory 670. Thus, the same reference numerals will be used to refer to same or similar parts as those described in the previous exemplary embodiment and any further repetitive explanation concerning the above elements may be omitted.

Referring to FIG. 11, the display system 600 according to the present exemplary embodiment includes the display apparatus 601, the graphic processing part 660 and the memory 670.

The display apparatus 601 includes the display panel 510, the gate driving part 130, the data driving part 340 and the timing controlling part 650.

The display panel 510 may be substantially the same as the display panel 110 according to the previous exemplary embodiment illustrated in FIG. 1. Thus, the display panel 510 receives the data signal DS from the data driving part 340 to display an image. The display panel 510 may be a touch display panel capable of sensing a touch. The display panel 510 outputs the touch data TDATA to the graphic processing part 660 and the timing controlling part 650 when a touch is generated on the display panel 510.

The gate driving part 130, the data driving part 340 and the timing controlling part 650 may be collectively referred to as a display panel driving apparatus for driving the display panel 510.

The gate driving part 130 is disposed adjacent a long side of the display panel 510. The gate driving part 130 generates the gate signals GS in response to the vertical start signal STV and the first clock signal CLK1 provided from the timing controlling part 650, and outputs the gate signals GS to the gate lines GL.

As shown in FIG. 11, the data driving part 340 is disposed adjacent a short side of the display panel 510. The data driving part 340 receives pivot image data PVDATA from the timing controlling part 650, generates the data signal DS based on the pivot image data PVDATA, and outputs the data signal DS to the data line DL in response to the horizontal start signal STH and the second clock signal CLK2 provided from the timing controlling part 650.

The timing controlling part 650 receives the touch process data TPDATA from the graphic processing part 660, and receives the control signal CON from an external source or component. The control signal CON may include the horizontal synchronous signal Hsync, the vertical synchronous signal Vsync and the clock signal CLK. The timing controlling part 650 generates the horizontal start signal STH using the horizontal synchronous signal Hsync and outputs the horizontal start signal STH to the data driving part 340. In addition, the timing controlling part 650 generates the vertical start signal STV using the vertical synchronous signal Vsync and outputs the vertical start signal STV to the gate driving part 130. In addition, the timing controlling part 650 generates the first clock signal CLK1 and the second clock signal CLK2 using the clock signal CLK, outputs the first clock signal CLK1 to the gate driving part 130, and outputs the second clock signal CLK2 to the data driving part 340.

The timing controlling part 650 includes a pivot performing part 651. The pivot performing part 651 performs the pivot function which rotates the image by about 90 degrees on the touch process data TPDATA, and outputs the pivot image data PVDATA to the data driving part 340. The timing controlling part 650 may perform the pivot function in response to the touch data TDATA received from the display panel 510. The timing controlling part 650 may receive, from the memory 670, the touch process data TPDATA stored in the memory 670, and may perform the pivot function on the touch process data TPDATA. Accordingly, the pivot image data PVDATA output from the timing controlling part 650 may include the touch process data TPDATA.

With continued reference to FIG. 11, the memory 670 receives the touch process data TPDATA and stores the touch process data TPDATA. The memory 670 receives the touch process data TPDATA from the graphic processing part 660, and stores the touch process data TPDATA.

The graphic processing part 660 includes a touch data processing part 662. The touch data processing part 662 receives the touch data TDATA from the display panel 510. The touch data processing part 662 processes the touch data TDATA and outputs the touch process data TPDATA for displaying an image related to the touch on the display panel 510.

Figure 12:
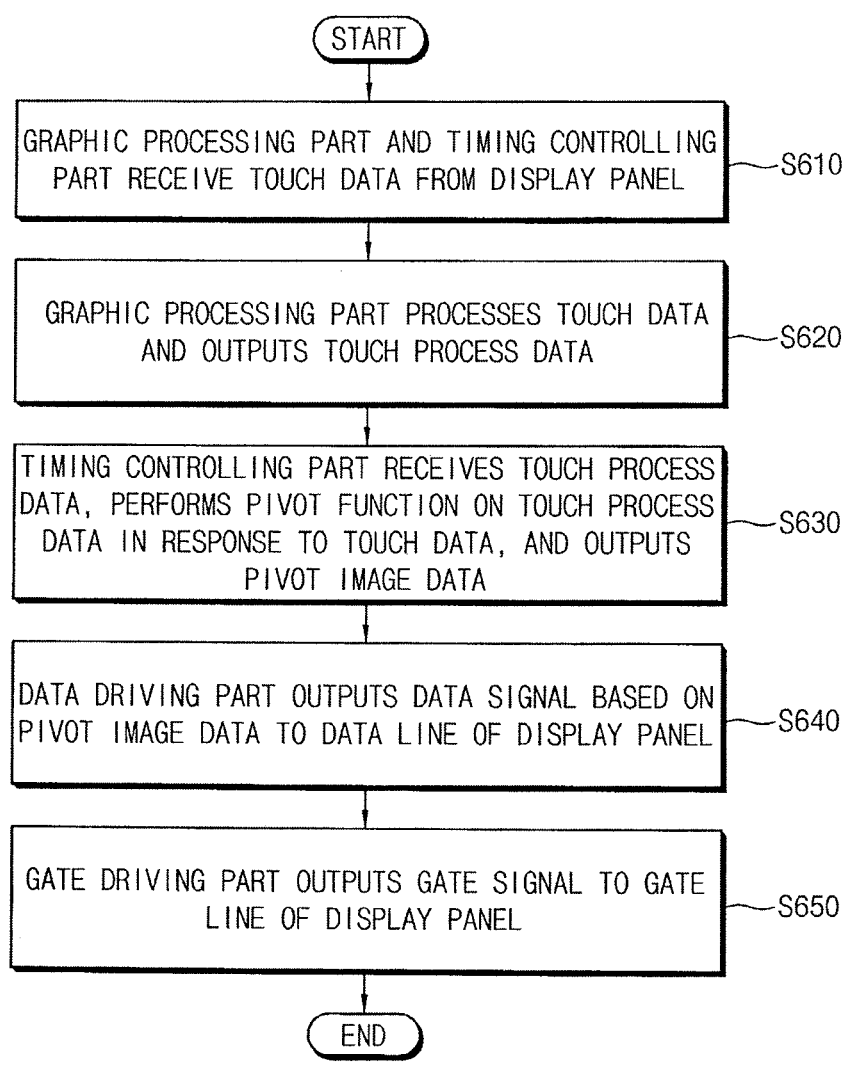
FIG. 12 is a flowchart illustrating a method of driving the display system of FIG. 11.

FIG. 12 is a flowchart illustrating a method of driving the display system 600 of FIG. 11.

Referring to FIGS. 11 and 12, at operation (S610), the graphic processing part 660 and the timing controlling part 650 receives the touch data TDATA from the display panel 510. More specifically, the display panel 510 outputs the touch data TDATA indicating a sense of the touch when the touch is generated on the display panel 510. The touch data processing part 662 of the graphic processing part 660 receives the touch data TDATA from the display panel 510, and the pivot performing part 651 of the timing controlling part 650 receives the touch data TDATA from the display panel 510.

At operation (S620), the graphic processing part 660 processes the touch data TDATA and outputs the touch process data TPDATA. More specifically, the graphic processing part 660 includes the touch data processing part 662. The touch data processing part 662 processes the touch data TDATA and outputs the touch process data TPDATA for displaying the image related to the touch on the display panel 510.

At operation (S630), the timing controlling part 650 receives the touch process data TPDATA, performs the pivot function on the touch process data TPDATA in response to the touch data TDATA, and outputs the pivot image data PVDATA. More specifically, the timing controlling part 650 includes the pivot performing part 651. The pivot performing part 651 performs the pivot function on the touch process data TPDATA, and outputs the pivot image data PVDATA to the data driving part 340. The timing controlling part 650 may perform the pivot function in response to the touch data TDATA received from the display panel 510. The timing controlling part 650 may receive, from the memory 670, the touch process data TPDATA stored in the memory 670, and may perform the pivot function on the touch process data TPDATA. Thus, the pivot image data PVDATA output from the timing controlling part 650 may include the touch process data TPDATA.

At operation (S640), the data driving part 340 outputs the data signal DS based on the pivot image data PVDATA to the data line DL of the display panel 510. More specifically, the data driving part 340 receives the pivot image data PVDATA from the timing controlling part 650, generates the data signal DS based on the pivot image data PVDATA, and outputs the data signal DS to the data line DL in response to the horizontal start signal STH and the second clock signal CLK2 provided from the timing controlling part 650.

At operation (S650), the gate driving part 130 outputs the gate signal GS to the gate line GL of the display panel 510. More specifically, the gate driving part 130 generates the gate signals GS in response to the vertical start signal STV and the first clock signal CLK1 provided from the timing controlling part 650, and outputs the gate signals GS to the gate lines GL.

According to the present exemplary embodiment, since the data driving part 340 is disposed adjacent the short side of the display panel 510, the number of data driving integrated circuits included in the data driving part 340 may be decreased. Thus, a manufacturing cost of the display apparatus 601 may be decreased.

In addition, the graphic processing part 660 processes the touch data TDATA and the timing controlling part 650 performs the pivot function, and thus a load of the graphic processing part 660 may be decreased. Thus, a delay time of an image display may be decreased by having the timing controlling part perform the pivot function.

Figure 13:
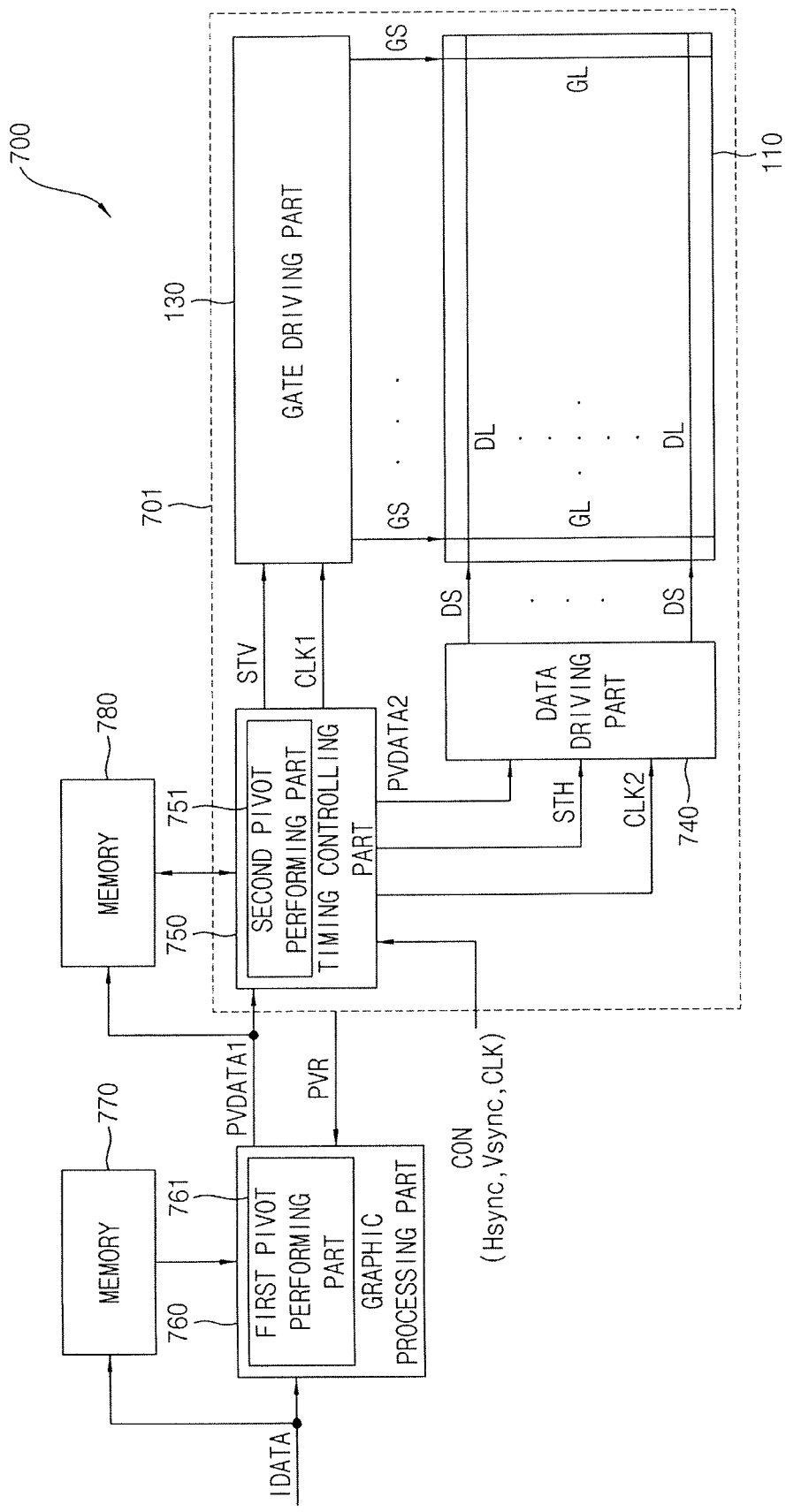
FIG. 13 is a block diagram illustrating a display system according to an exemplary embodiment of the present inventive concept.

FIG. 13 is a block diagram illustrating a display system according to an exemplary embodiment of the present inventive concept.

The display system 700 according to the present exemplary embodiment illustrated in FIG. 13 may be substantially similar or the same as the display system 100 according to the previous exemplary embodiment illustrated in FIG. 1 except for a display apparatus 701, a data driving part 740, a timing controlling part 750, a graphic processing part 760, a first memory 770 and a second memory 780. Thus, the same reference numerals will be used to refer to same or similar parts as those described in the previous exemplary embodiment and any further repetitive explanation concerning the above elements may be omitted.

Referring to FIG. 13, the display system 700 according to the present exemplary embodiment may include the display apparatus 701, the graphic processing part 760, the first memory 770 and the second memory 780.

The display apparatus 701 includes the display panel 110, the gate driving part 130, the data driving part 740 and the timing controlling part 750.

The gate driving part 130, the data driving part 740 and the timing controlling part 750 may be collectively referred to as a display panel driving apparatus for driving the display panel 110.

The gate driving part 130 is disposed adjacent a long side of the display panel 110. The gate driving part 130 generates the gate signals GS in response to the vertical start signal STV and the first clock signal CLK1 provided from the timing controlling part 750, and outputs the gate signals GS to the gate lines GL.

The data driving part 740 is disposed adjacent a short side of the display panel 110. The data driving part 740 receives second pivot image data PVDATA2 from the timing controlling part 750, generates the data signal DS based on the second pivot image data PVDATA2, and outputs the data signal DS to the data line DL in response to the horizontal start signal STH and the second clock signal CLK2 provided from the timing controlling part 750.

The graphic processing part 760 receives the image data IDATA from an external source of component. The graphic processing part 760 includes a first pivot performing part 761. The first pivot performing part 761 performs a first pivot function on the image data IDATA, and outputs first pivot image data PVDATA1 to the timing controlling part 750. Here, the performance of the first pivot function may be a performance of the pivot function on only some (e.g. part) of the image data IDATA. The graphic processing part 760 may perform the first pivot function in response to the pivot request data PVR received from the display apparatus 701. The pivot request data PVR may be an Extended Display Identification Data (EDID). The graphic processing part 760 may receive, from the memory 770, the image data IDATA stored in the first memory 770, and may perform the first pivot function on the image data IDATA.

The first memory 770 receives the image data IDATA and stores the image data IDATA.

The timing controlling part 750 receives the first pivot image data PVDATA1 from the graphic processing part 760, and receives the control signal CON from an outside. The control signal CON may include the horizontal synchronous signal Hsync, the vertical synchronous signal Vsync and the clock signal CLK. The timing controlling part 750 generates the horizontal start signal STH using the horizontal synchronous signal Hsync and outputs the horizontal start signal STH to the data driving part 740. In addition, the timing controlling part 750 generates the vertical start signal STV using the vertical synchronous signal Vsync and outputs the vertical start signal STV to the gate driving part 130. In addition, the timing controlling part 750 generates the first clock signal CLK1 and the second clock signal CLK2 using the clock signal CLK, outputs the first clock signal CLK1 to the gate driving part 130, and outputs the second clock signal CLK2 to the data driving part 740.

The timing controlling part 750 includes a second pivot performing part 751. The second pivot performing part 751 performs a second pivot function on the first pivot image data PVDATA1, and outputs the second pivot image data PVDATA2 to the data driving part 740. Here, the performance of the second pivot function by the second pivot performing part 751 may be a performance of the pivot function on the remainder of the image data IDATA which did not have a pivot function performed by the first pivot performing part 761. The timing controlling part 750 may receive, from the second memory 780, the first pivot image data PVDATA1 stored in the second memory 780, and may perform the second pivot function on the first pivot image data PVDATA1.

Figure 14:
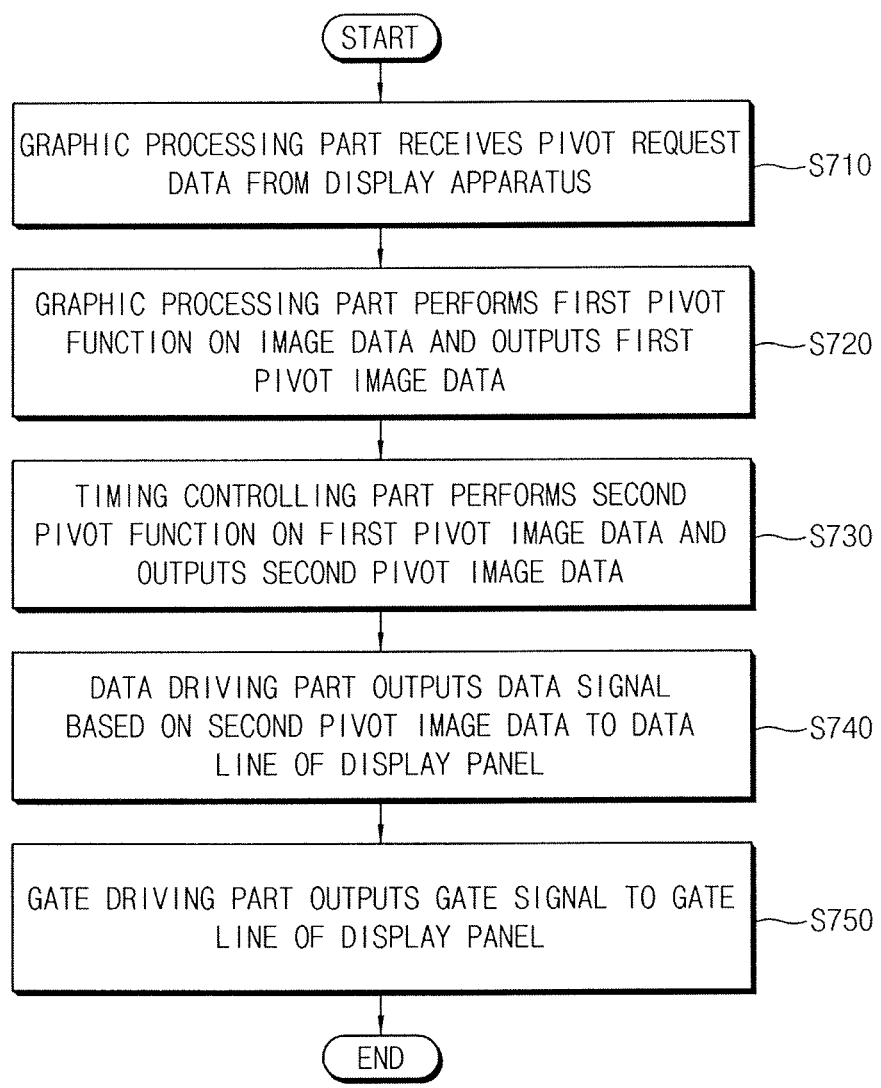
FIG. 14 is a flowchart illustrating a method of driving the display system of FIG. 13.

FIG. 14 is a flowchart illustrating a method of driving the display system 700 of FIG. 13.

Referring to FIGS. 13 and 14, at operation (S710), the graphic processing part 760 receives the pivot request data PVR from the display apparatus 701. More specifically, the graphic processing part 760 receives the pivot request data PVR from the display apparatus 701 including the display panel 110, the gate driving part 130, the data driving part 740 and the timing controlling part 750. The pivot request data PVR may be an Extended Display Identification Data (EDID).

At operation (S720), the graphic processing part 760 performs the first pivot function on the image data IDATA and outputs the first pivot image data PVDATA1. More specifically, the graphic processing part 760 includes the first pivot performing part 761. The first pivot performing part 761 performs the first pivot function on the image data IDATA, and outputs the first pivot image data PVDATA1 to the timing controlling part 750. Here, the performance of the first pivot function may made on some (but not all) of the image data IDATA. The graphic processing part 760 may perform the first pivot function in response to the pivot request data PVR received from the display apparatus 701. The graphic processing part 760 may receive, from the first memory 770, the image data IDATA stored in the memory 770, and may perform the first pivot function on the image data IDATA.

At operation (S730), the timing controlling part 750 performs the second pivot function on the first pivot image data PVDATA1 and outputs the second pivot image data PVDATA2. More specifically, the timing controlling part 750 includes the second pivot performing part 751. The second pivot performing part 751 performs the second pivot function on the first pivot image data PVDATA1, and outputs the second pivot image data PVDATA2 to the data driving part 740. Here, the performance of the second pivot function by the second pivot performing part 751 may be made on the remaining image data IDATA as only some of the image data had the first pivot function performed by the first pivot performing part 761. The timing controlling part 750 may receive, from the second memory 780, the first pivot image data PVDATA1 stored in the second memory 780, and may perform the second pivot function on the first pivot image data PVDATA1.

At operation (S740), the data driving part 740 outputs the data signal DS based on the second pivot image data PVDATA2 to the data line DL of the display panel 110. More specifically, the data driving part 740 receives the second pivot image data PVDATA2 from the timing controlling part 750, generates the data signal DS based on the second pivot image data PVDATA2, and outputs the data signal DS to the data line DL in response to the horizontal start signal STH and the second clock signal CLK2 provided from the timing controlling part 750.

At operation (S750), the gate driving part 130 outputs the gate signal GS to the gate line GL of the display panel 110. More specifically, the gate driving part 130 generates the gate signals GS in response to the vertical start signal STV and the first clock signal CLK1 provided from the timing controlling part 750, and outputs the gate signals GS to the gate lines GL.

According to the present exemplary embodiment, since the data driving part 740 is disposed adjacent the short side of the display panel 110, the number of data driving integrated circuits included in the data driving part 740 may be decreased. Thus, a manufacturing cost of the display apparatus 701 may be decreased.

In addition, since the graphic processing part 760 performs the first pivot function and the timing controlling part 750 performs the second pivot function, a load of the graphic processing part 760 may be decreased by having two components perform the pivot function on portions of the IDATA. Thus, a delay time of an image display may be decreased.

Figure 15:
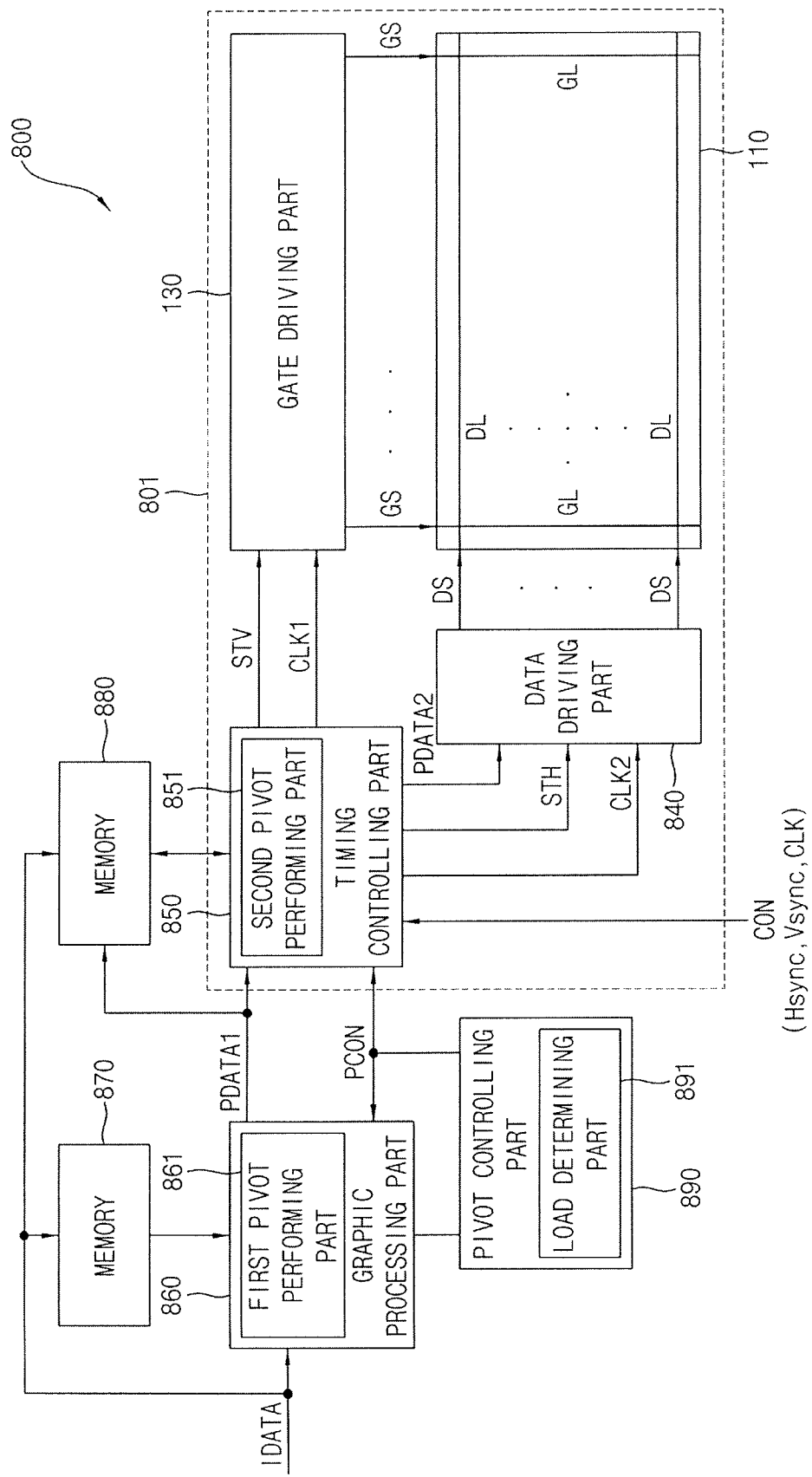
FIG. 15 is a block diagram illustrating a display system according to an exemplary embodiment of the present inventive concept.

FIG. 15 is a block diagram illustrating a display system according to an exemplary embodiment of the present inventive concept.

The display system 800 according to the present exemplary embodiment illustrated in FIG. 15 may be substantially similar or the same as the display system 100 according to the previous exemplary embodiment illustrated in FIG. 1 except for a display apparatus 801, a data driving part 840, a timing controlling part 850, a graphic processing part 860, a first memory 870, a second memory 880 and a pivot controlling part 890. Thus, the same reference numerals will be used to refer to same or similar parts as those described in the previous exemplary embodiment and any further repetitive explanation concerning the above elements may be omitted.

Referring to FIG. 15, the display system 800 according to the present exemplary embodiment includes the display apparatus 801, the graphic processing part 860, the first memory 870, the second memory 880 and the pivot controlling part 890.

The display apparatus 801 includes the display panel 110, the gate driving part 130, the data driving part 840 and the timing controlling part 850.

The gate driving part 130, the data driving part 840 and the timing controlling part 850 may be collectively referred to as a display panel driving apparatus for driving the display panel 110.

The gate driving part 130 is disposed adjacent a long side of the display panel 110. The gate driving part 130 generates the gate signals GS in response to the vertical start signal STV and the first clock signal CLK1 provided from the timing controlling part 850, and outputs the gate signals GS to the gate lines GL.

The data driving part 840 is disposed adjacent a short side of the display panel 110. The data driving part 840 receives second image process data PDATA2 from the timing controlling part 850, generates the data signal DS based on the second image process data PDATA2, and outputs the data signal DS to the data line DL in response to the horizontal start signal STH and the second clock signal CLK2 provided from the timing controlling part 850.

The graphic processing part 860 receives the image data IDATA from an external source or component. The graphic processing part 860 performs an image process on the image data IDATA, and outputs first image process data PDATA1 to the timing controlling part 850.

The pivot controlling part 890 controls the graphic processing part 860 and the timing controlling part 850 such that at least one of the processing part 860 and the timing controlling part 850 performs a pivot function on the image data IDATA.

More specifically, the pivot controlling part 890 outputs a pivot control signal PCON for controlling the pivot function of the graphic processing part 860 and the timing controlling part 850, to the graphic processing part 860 and the timing controlling part 850.

For example, when a load of the graphic processing part 860 is less than a reference load value, and thus a driving frequency of the graphic processing part 860 is greater than a reference frequency, the pivot controlling part 890 may control the graphic processing part 860 so that the graphic processing part 860 performs the pivot function on the image data IDATA. In this case, the first image process data PDATA1 output from the graphic processing part 860 may include pivot image data which is generated by performing the pivot function on the image data IDATA.

When the graphic processing part 860 performs the pivot function, a first pivot performing part 861 in the graphic processing part 860 may perform the pivot function. In addition, the graphic processing part 860 may receive, from the first memory 870, the image data IDATA stored in the first memory 870, and performs the pivot function on the image data IDATA.

Alternatively, when the load of the graphic processing part 860 is equal to or greater than the reference load value, and thus the driving frequency of the graphic processing part 860 is equal to or less than the reference frequency, the pivot controlling part 890 may control the graphic processing part 860 and the timing controlling part 850 so that the graphic processing part 860 does not perform the pivot function on the image data IDATA. Under the aforementioned conditions, the timing controlling part 850 performs the pivot function on the image data IDATA. In this case, the first image process data PDATA1 output from the graphic processing part 860 may not include the pivot image data, and the second image process data PDATA2 output from the timing controlling part 850 may include the pivot image data generated by performing the pivot function on the image data IDATA. According to the inventive concept, the pivot function may be performed according to the load value of the graphic processing part 860, and the driving frequency of the graphic processing part by the graphic processing part, or the timing controlling part.

When the timing controlling part 850 performs the pivot function, a second pivot performing part 851 in the timing controlling part 850 may perform the pivot function. In addition, the timing controlling part 850 may receive, from the second memory 880, the image data IDATA stored in the second memory 880, and may perform the pivot function on the image data IDATA.

In addition, for example, when the load of the graphic processing part 860 is less than the reference load value, and thus the driving frequency of the graphic processing part 860 is greater than the reference frequency, the pivot controlling part 890 may control the graphic processing part 860 and the timing controlling part 850 so that the graphic processing part 860 performs the pivot function on some (e.g. part) of the image data IDATA and the timing controlling part 850 performs the pivot function on a remainder of the image data IDATA. Here, the some of the image data IDATA may be M (M is a natural number) frame of N (N is a natural number not less than two) frames of the image data IDATA, and the remains of the image data IDATA may be (N-M) frame of N frames. In this case, the first image process data PDATA1 output from the graphic processing part 860 may include first pivot image data generated by performing a first pivot function on the image data IDATA, and the second image process data PDATA2 output from the timing controlling part 850 may include second pivot image data generated by performing a second pivot function in addition to the first pivot function on the image data IDATA.

With continued reference to FIG. 15, the pivot controlling part 890 may include a load determining part 891 determining the load and the driving frequency of the graphic processing part 860. For example, the reference frequency compared with the driving frequency of the graphic processing part 860, which is determined by the load determining part 891 may be about 40 Hz.

The first memory 870 receives the image data IDATA from an external source of component and stores the image data IDATA.

The second memory 880 receives the image data IDATA from the outside and stores the image data IDATA. In addition, the second memory 880 receives the first image process data PDATA1 from the graphic processing part 860 and stores the first image process data PDATA1.

Figure 16:
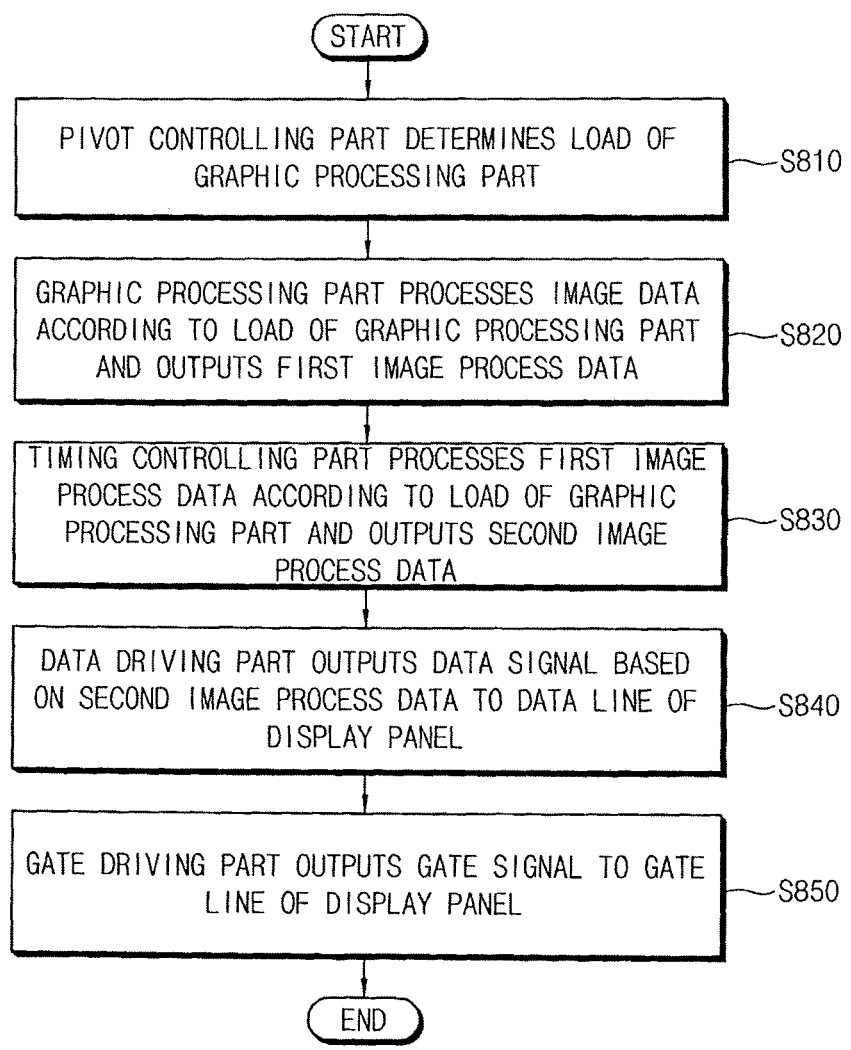
FIG. 16 is a flowchart illustrating a method of driving the display system of FIG. 15.

FIG. 16 is a flowchart illustrating a method of driving the display system 800 of FIG. 15.

Referring to FIGS. 15 and 16, at operation (S810) the pivot controlling part 890 determines the load of the graphic processing part 860. More specifically, the pivot controlling part 890 may include the load determining part 891 determining the load and the driving frequency of the graphic processing part 860. For example, the reference frequency, which is compared with the driving frequency of the graphic processing part 860, may be determined by the load determining part 891. For example, the reference frequency may be about 40 Hz.

At operation (S820), the graphic processing part 860 processes the image data IDATA according to the load of the graphic processing part 860, and outputs the first image process data PDATA1. For example, when the load of the graphic processing part 860 is less than the reference load value, and thus the driving frequency of the graphic processing part 860 is greater than the reference frequency, the pivot controlling part 890 may control the graphic processing part 860 so that the graphic processing part 860 performs the pivot function on the image data IDATA. In this case, the first image process data PDATA1 output from the graphic processing part 860 may include the pivot image data which is generated by performing the pivot function on the image data IDATA.

With continued reference to FIG. 15, when the graphic processing part 860 performs the pivot function, the first pivot performing part 861 in the graphic processing part 860 may perform the pivot function. In addition, the graphic processing part 860 may receive, from the first memory 870, the image data IDATA stored in the first memory 870, and performs the pivot function on the image data IDATA.

Alternatively, when the load of the graphic processing part 860 is equal to or greater than the reference load value, and thus the driving frequency of the graphic processing part 860 is equal to or less than the reference frequency, the pivot controlling part 890 may control the graphic processing part 860 so that the graphic processing part 860 does not perform the pivot function on the image data IDATA. In this case, the first image process data PDATA1 output from the graphic processing part 860 may not include the pivot image data.

In addition, for example, when the load of the graphic processing part 860 is less than the reference load value, and thus the driving frequency of the graphic processing part 860 is greater than the reference frequency, the pivot controlling part 890 may control the graphic processing part 860 so that the graphic processing part 860 performs the pivot function on some (e.g. part) of the image data IDATA. Here, some of the image data IDATA may be M (M is a natural number) frame of N (N is a natural number not less than two) frames of the image data IDATA. In this case, the first image process data PDATA1 output from the graphic processing part 860 may include the first pivot image data generated by performing the first pivot function on the image data IDATA.

At operation (S830), the timing controlling part 850 processes the first image process data PDATA1 according to the load of the graphic processing part 860, and outputs the second image process data PDATA2. For example, when the load of the graphic processing part 860 is equal to or greater than the reference load value, and thus the driving frequency of the graphic processing part 860 is equal to or less than the reference frequency, the pivot controlling part 890 may control the timing controlling part 850 so that the timing controlling part 850 performs the pivot function on the image data IDATA. In this case, the first image process data PDATA1 output from the graphic processing part 860 may not include the pivot image data, and the second image process data PDATA2 output from the timing controlling part 850 may include the pivot image data generated by performing the pivot function on the image data IDATA.

When the timing controlling part 850 performs the pivot function, the second pivot performing part 851 in the timing controlling part 850 may perform the pivot function. In addition, the timing controlling part 850 may receive, from the second memory 880, the image data IDATA stored in the second memory 880, and may perform the pivot function on the image data IDATA.

In addition, for example, when the load of the graphic processing part 860 is less than the reference load value, and thus the driving frequency of the graphic processing part 860 is greater than the reference frequency, the pivot controlling part 890 may control the timing controlling part 850 so that the timing controlling part 850 performs the pivot function on the remainder of the image data IDATA. Here, the remains of the image data IDATA may be (N-M) frame of N frames. In this case, the first image process data PDATA1 output from the graphic processing part 860 may include the first pivot image data generated by performing the first pivot function on the image data IDATA, and the second image process data PDATA2 output from the timing controlling part 850 may include the second pivot image data generated by performing the second pivot function in addition to the first pivot function on the image data IDATA.

At operation (S840), the data driving part 840 outputs the data signal DS based on the second image process data PDATA to the data line DL of the display panel 110. Specifically, the data driving part 840 receives the second image process data PDATA2 from the timing controlling part 850, generates the data signal DS based on the second image process data PDATA2, and outputs the data signal DS to the data line DL in response to the horizontal start signal STH and the second clock signal CLK2 provided from the timing controlling part 850.

At operation (S850), the gate driving part 130 outputs the gate signal GS to the gate line GL of the display panel 110. Specifically, the gate driving part 130 generates the gate signals GS in response to the vertical start signal STV and the first clock signal CLK1 provided from the timing controlling part 850, and outputs the gate signals GS to the gate lines GL.

According to the present exemplary embodiment, since the data driving part 840 is disposed adjacent the short side of the display panel 110, the number of data driving integrated circuits included in the data driving part 840 may be decreased. Thus, a manufacturing cost of the display apparatus 801 may be decreased.

In addition, at least one of the graphic processing part 860 and the timing controlling part 850 performs the pivot function in consideration of the load and the driving frequency of the graphic processing part 860, a delay time of an image display may be decreased.

The present inventive concept may be applied to an electronic device having a display apparatus. For example, the present inventive concept may be applied to a television, a computer monitor, a laptop, a digital camera, a cellular phone, a smart phone, a tablet Personal Computer (PC), a smart pad, a Personal Digital Assistant (PDA), a Portable Multimedia Player (PMP), an MP3 player, a navigation system, a camcorder, a portable game console, etc., just to name some non-limiting examples. In addition, an artisan should understand and appreciate that while some of the examples refer to the pivot function rotating the image by about 90 degrees, the inventive concept is not limited to this amount, and may be rotated by any degree desired (e.g. about 45 degrees, about 180 degrees, about 270 degrees), the rotation may be in a clockwise or counterclockwise direction.

The foregoing is illustrative of the present inventive concept and is not to be construed as limiting thereof. Although a few exemplary embodiments of the present inventive concept have been described, those skilled in the art will readily appreciate that many modifications are possible in the exemplary embodiments without materially departing from the novel teachings and advantages of the present inventive concept. Accordingly, all such modifications are to be included within the scope of the present inventive concept as defined in the claims. In the claims, means-plus-function clauses are intended to cover the structures described herein as performing the recited function and not only structural equivalents but also equivalent structures. Therefore, a person of ordinary skill in the art should understand that the foregoing is illustrative of the present inventive concept and is not to be construed as limiting the inventive concept to the specific exemplary embodiments disclosed, and that modifications to the disclosed exemplary embodiments, as well as other exemplary embodiments, are to be included within the scope of the appended claims. The present inventive concept is defined by the following claims, with equivalents of the claims to be included therein.

What is claimed is:

1. A display system comprising:
   a display apparatus comprising a display panel configured to display an image and including a gate line and a data line, a gate driving part configured to output a gate signal to the gate line, and a data driving part configured to output a data signal to the data line; and
   a pivot performing part configured to receive, from the display apparatus, a pivot request data to perform a pivot function which rotates a display of the image, and in response to receiving the pivot request data, to perform the pivot function on image data of the image by rotating the image data to produce pivot image data without an instruction from an external operating system,
   wherein the pivot performing part comprises a first pivot performing part configured to perform a first pivot function on at least a part of the image data, and to output first pivot image data and a second pivot performing part configured to receive the first pivot image data, to perform a second pivot function except for the part of the image data on which the first pivot function was performed, and to output second pivot image data, and
   wherein the gate driving part is disposed adjacent to a longer side of the display panel and the data driving part is disposed adjacent to a shorter side of the display panel.

2. The display system of claim 1, further comprising:
   a graphic processing part configured to receive the image data from an external source or component, and to process the image data,
   wherein the first pivot performing part is included in the graphic processing part.

3. The display system of claim 2, further comprising:
   a memory configured to receive and store the image data,
   wherein the graphic processing part performs the first pivot function on the image data stored in the memory.

4. The display system of claim 2, wherein the display panel outputs a touch data to the graphic processing part when a touch is detected on the display panel, and in response to receiving the touch data, the graphic processing part performs the pivot function.

5. The display system of claim 4, wherein the graphic processing part further comprises a touch data processing part configured to process the touch data and output touch process data including an image related to the touch.

6. The display system of claim 5, wherein the graphic processing part performs the first pivot function on the image data and outputs the first pivot image data, and the pivot image data includes the touch process data.

7. The display system of claim 4, further comprising:
   a timing controlling part configured to control a timing of the gate driving part and a timing of the data driving part based on a received control signal,
   wherein the timing controlling part includes a touch data processing part configured to process the touch data and output touch process data including an image related to the touch.

8. The display system of claim 1, further comprising:
   a timing controlling part configured to control a timing of the gate driving part and a timing of the data driving part based on a received control signal,
   wherein the second pivot performing part is included in the timing controlling part.

9. The display system of claim 8, further comprising:
   a memory configured to receive and store the image data,
   wherein the timing controlling part performs the second pivot function on the image data stored in the memory.

10. The display system of claim 8, wherein the display panel outputs a touch data when a touch is detected on the display panel, and the timing controlling part performs the second pivot function in response to the touch data being received.

11. The display system of claim 10, wherein the timing controlling part further includes a touch data processing part configured to process the touch data and output touch process data including an image related to the touch.

12. The display system of claim 11, wherein the timing controlling part performs the second pivot function on the image data and outputs pivot image data, and the pivot image data includes the touch process data.

13. The display system of claim 10, further comprising:
a graphic processing part configured to receive the image data from an external source or component, and to process the image data,
wherein the graphic processing part comprises a touch data processing part configured to process the touch data and output touch process data including an image related to the touch data.

14. The display system of claim 1, further comprising:
a graphic processing part configured to receive the image data from an external source or component, and to process the image data; and
a timing controlling part configured to control a timing of the gate driving part and a timing of the data driving part,
a first memory connected to the graphic processing part, the first memory configured to receive and store the image data;
a second memory connected to the timing controlling part, the second memory configured to receive and store the image data,
wherein the graphic processing part performs the first pivot function on the image data stored in the first memory, and the timing controlling part performs the second pivot function on the image data stored in the second memory, and
wherein the first pivot performing part is included in the graphic processing part, and the second pivot performing part is included in the timing controlling part.

15. The display system of claim 14, further comprising:
a pivot controlling part configured to control the graphic processing part and the timing controlling part so that at least one of the graphic processing part and the timing controlling part performs the pivot function, according to a driving frequency of the graphic processing part.

16. The display system of claim 15, wherein the pivot controlling part further comprises a load determining part configured to determine a load of the graphic processing part.

17. The display system of claim 1, wherein the data line extends in a first direction parallel to the longer side of the display panel, and the gate line extends in a second direction parallel to the shorter side of the display panel.

18. The display system of claim 1, wherein the data signal is based on the pivot image data and the gate signal is independent of the pivot image data.

19. A method of driving a display system, the method comprising:
receiving, from a display apparatus, a pivot request data for performing a pivot function which rotates a display of an image, the display apparatus comprising a display panel configured to display the image, a graphics processing part, a timing controller, a gate driving part configured to output a gate signal to a gate line of the display panel, and a data driving part configured to output a data signal to a data line of the display panel;
performing, at the graphics processing part, a first pivot function of the pivot function on at least a part of image data of the image to produce first pivot image data;
performing, at the timing controller, a second pivot function of the pivot function on the image data of the image except for the part of the image data on which the first pivot function was performed, wherein the pivot function is performed in response to the pivot request data to output pivot image data by rotating the image data to produce the pivot image data without an instruction from an external operating system;
generating the data signal based on the pivot image data and outputting the data signal to the data line of the display panel; and
outputting the gate signal to the gate line of the display panel.

* * * * *